US009996620B2

(12) United States Patent
Campbell et al.

(10) Patent No.: US 9,996,620 B2
(45) Date of Patent: Jun. 12, 2018

(54) CONTINUOUS CONTENT REFINEMENT OF TOPICS OF USER INTEREST

(75) Inventors: Neil Gawain Campbell, San Francisco, CA (US); Barry Crane, Menlo Park, CA (US); James Andrew Long, Santa Clara, CA (US)

(73) Assignee: Excalibur IP, LLC, New York, NY (US)

( * ) Notice: Subject to any disclaimer, the term of this patent is extended or adjusted under 35 U.S.C. 154(b) by 389 days.

(21) Appl. No.: 12/980,076

(22) Filed: Dec. 28, 2010

(65) Prior Publication Data
US 2012/0167010 A1 Jun. 28, 2012

(51) Int. Cl.
*G06F 17/30* (2006.01)
*G06F 3/0482* (2013.01)

(52) U.S. Cl.
CPC ...... *G06F 17/30867* (2013.01); *G06F 3/0482* (2013.01); *G06F 17/3071* (2013.01); *G06F 17/30693* (2013.01); *G06F 17/30713* (2013.01); *G06F 17/30828* (2013.01)

(58) Field of Classification Search
CPC ............ G06F 17/30554; G06F 3/0482; G06F 17/30828; G06F 17/30867
USPC .................. 715/825, 811; 707/738, 708, 108
See application file for complete search history.

(56) References Cited

U.S. PATENT DOCUMENTS

| | | | |
|---|---|---|---|
| 5,913,215 A | 6/1999 | Rubenstein et al. | |
| 5,966,126 A | 10/1999 | Szabo | |
| 6,137,488 A | 10/2000 | Kraft et al. | |
| 6,396,488 B1 | 5/2002 | Simmons et al. | |

(Continued)

FOREIGN PATENT DOCUMENTS

| | | |
|---|---|---|
| KR | 10-2009-0051540 A | 5/2009 |
| WO | 2011/139477 A2 | 11/2011 |

(Continued)

OTHER PUBLICATIONS

International Search Report and Written Opinion received for PCT Application No. PCT/US2011/031708, dated Nov. 9, 2011, 10 pages.

(Continued)

*Primary Examiner* — Christopher J Fibbi
(74) *Attorney, Agent, or Firm* — Berkeley Law & Technology Group, LLP

(57) ABSTRACT

Techniques are disclosed for a user interface that provides active assistance to discover, investigate, refine and save multiple topics of interest, i.e., a topic incubator where user interests are discovered, quickly developed to maturity and preserved. Each topic may have an independent topic interface with independently suggested topics. In each topic interface, users may control topic development by selecting saved topics, dynamically suggested topics and manually entered topics. Suggested topics may be based on saved interests, related interests and/or browsed content. Suggested topics may differ between topic interfaces and may change with topics. Suggested topics may be continuously refined or updated based on existing topics, changed topics, selected suggested topics and selected content. Users control treatment of selected topics individually or as refinements of (combinations with) other topics to create compound topics. Users replace or refine existing topics in existing topic interfaces or branch off topics into additional topic interfaces.

19 Claims, 13 Drawing Sheets

(56) References Cited

U.S. PATENT DOCUMENTS

| | | |
|---|---|---|
| 6,513,031 B1 | 1/2003 | Fries et al. |
| 6,658,404 B1 | 12/2003 | Cecchini |
| 7,003,730 B2 | 2/2006 | Dettinger et al. |
| 7,085,757 B2 | 8/2006 | Dettinger et al. |
| 7,685,507 B2 | 3/2010 | Workman et al. |
| 7,769,794 B2 | 8/2010 | Moore et al. |
| 7,856,441 B1 | 12/2010 | Kraft et al. |
| 7,873,641 B2 | 1/2011 | Frieden et al. |
| 7,958,107 B2 | 6/2011 | Curtis |
| 8,010,646 B2 | 8/2011 | Bier et al. |
| 8,122,031 B1* | 2/2012 | Mauro et al. ................. 707/748 |
| 8,150,829 B2 | 4/2012 | Labrou et al. |
| 8,205,166 B2 | 6/2012 | Gotz |
| 8,255,812 B1* | 8/2012 | Parparita et al. ............. 715/762 |
| 2005/0033657 A1* | 2/2005 | Herrington et al. ............ 705/26 |
| 2005/0114801 A1 | 5/2005 | Yang et al. |
| 2005/0209999 A1 | 9/2005 | Jou |
| 2006/0036568 A1 | 2/2006 | Moore et al. |
| 2006/0230021 A1* | 10/2006 | Diab ................. G06F 17/30873 |
| 2006/0235873 A1 | 10/2006 | Thomas |
| 2007/0078832 A1 | 4/2007 | Ott et al. |
| 2007/0192807 A1* | 8/2007 | Howcroft ........... H04N 7/17318 725/86 |
| 2007/0265996 A1* | 11/2007 | Odom ............... G06F 17/30616 |
| 2007/0282811 A1* | 12/2007 | Musgrove ......... G06F 17/30672 |
| 2008/0059897 A1 | 3/2008 | Dilorenzo |
| 2008/0072145 A1 | 3/2008 | Blanchard et al. |
| 2008/0082941 A1* | 4/2008 | Goldberg et al. ............. 715/810 |
| 2008/0092044 A1 | 4/2008 | Lewis et al. |
| 2008/0189635 A1 | 8/2008 | Park et al. |
| 2008/0201645 A1 | 8/2008 | Francis et al. |
| 2008/0209343 A1 | 8/2008 | Macadaan et al. |
| 2008/0228745 A1 | 9/2008 | Markus et al. |
| 2008/0235289 A1 | 9/2008 | Carnes et al. |
| 2008/0250333 A1 | 10/2008 | Reeves et al. |
| 2008/0255977 A1 | 10/2008 | Altberg et al. |
| 2009/0055355 A1 | 2/2009 | Brunner et al. |
| 2009/0089678 A1 | 4/2009 | Sacco et al. |
| 2009/0094190 A1 | 4/2009 | Stephens |
| 2009/0132526 A1 | 5/2009 | Park |
| 2009/0158146 A1 | 6/2009 | Curtis et al. |
| 2009/0187558 A1 | 7/2009 | McDonald |
| 2009/0240674 A1* | 9/2009 | Wilde ............... G06F 17/30899 |
| 2009/0241066 A1 | 9/2009 | Costello |
| 2009/0254838 A1* | 10/2009 | Rao et al. ..................... 715/749 |
| 2009/0259636 A1 | 10/2009 | Labrou et al. |
| 2009/0287989 A1 | 11/2009 | Chakra et al. |
| 2009/0299725 A1 | 12/2009 | Grigsby et al. |
| 2010/0023868 A1 | 1/2010 | Bonforte et al. |
| 2010/0153862 A1 | 6/2010 | Schreiber |
| 2010/0161631 A1 | 6/2010 | Yu et al. |
| 2010/0223134 A1 | 9/2010 | Lunenfeld |
| 2011/0004499 A1 | 1/2011 | Zhang et al. |
| 2011/0072000 A1 | 3/2011 | Haas et al. |
| 2011/0252342 A1* | 10/2011 | Broman ........................ 715/760 |
| 2011/0276921 A1* | 11/2011 | Long ............................. 715/825 |
| 2012/0005209 A1 | 1/2012 | Rinearson et al. |
| 2012/0084657 A1 | 4/2012 | Ranade et al. |
| 2012/0167010 A1 | 6/2012 | Campbell et al. |

FOREIGN PATENT DOCUMENTS

| | | |
|---|---|---|
| WO | 2011139477 A2 | 11/2011 |
| WO | 2011/139477 A3 | 12/2011 |
| WO | 2011139477 A3 | 12/2011 |
| WO | 2012/092059 A2 | 7/2012 |
| WO | 2012092059 A3 | 11/2012 |

OTHER PUBLICATIONS

"Topicfire", Real-time ranked news, retrieved from <http://topicfire.com/> on Feb. 3, 2012, 7 pages.

"DailyPerfect", Predictively Personalized News, Behavioral Targeting Technology, retrieved from <http://www.dailyperfect.com/> on Feb. 3, 2012, 1 page.

"@WalmartLabs", retrieved from <http://www.walmartlabs.com/>, redirected from <www.meehive.com> on Feb. 3, 2012, 1 page.

"cloudlet.com: The Leading Ontario, Canada Site on the Net", retrieved from <http://www.cloudlet.com/search.php?uid=www4f27aeced1c761.55227552&src=d> on Feb. 3, 2012, 1 page.

"Do something, Learn something Share something, Change something", retrieved from <www.meetup.com> on Feb. 8, 2012, 3 pages.

"LiveJournal", retrieved from <www.livejournal.com> on Feb. 8, 2012, 3 pages.

Search Report and Written Opinion received for International Patent Application No. PCT/US2011/066439, dated Sep. 17, 2012, 9 pages.

Schroeder, "20 Ways to Aggregate Your Social Networking Profiles," Jul. 17, 2007, http://mashable.com/2007/07/17/social-network-aggregators/.

U.S. Appl. No. 12/894,461, filed Sep. 30, 2010, 73 pages.

U.S. Appl. No. 12/894,461, filed Oct. 15, 2010, 3 pages.

U.S. Appl. No. 12/894,461, Notice of Publication, dated Apr. 5, 2012, 1 page.

U.S. Appl. No. 12/894,461: Non-Final Rejection, dated Feb. 19, 2013, 33 pages.

U.S. Appl. No. 12/894,461: Amendment/Req. Reconsideration-After Non-Final Rejection, dated May 20, 2013, 33 pages.

U.S. Appl. No. 12/894,461: RCE and Amendments, dated Aug. 12, 2013, 35 pages.

U.S. Appl. No. 12/894,461: Non-Final Rejection, dated May 22, 2014, 39 pages.

U.S. Appl. No. 12/894,461: Amendment/Req. Reconsideration-After Non-Final Rejection, dated Aug. 22, 2014, 30 pages.

U.S. Appl. No. 12/894,461: Final Rejection, dated Oct. 8, 2014, 39 pages.

U.S. Appl. No. 12/894,461: After Final Consideration Program Request, Dec. 8, 2014, 28 pages.

U.S. Appl. No. 12/894,461: After Final Consideration Program Decision, Dec. 19, 2014, 1 page.

U.S. Appl. No. 12/894,461: Abandonment, Apr. 21, 2015, 2 pages.

U.S. Appl. No. 12/774,548, filed May 5, 2010, 48 pages.

U.S. Appl. No. 12/774,548, filed May 19, 2010, 3 pages.

U.S. Appl. No. 12/774,548: Notice of Publication, dated Nov. 10, 2011, 1 page.

U.S. Appl. No. 12/774,548: Non-Final Rejection, dated May 17, 2012, 19 pages.

U.S. Appl. No. 12/774,548: Amendment/Req. Reconsideration-After Non-Final Rejection, dated Oct. 17, 2012, 18 pages.

U.S. Appl. No. 12/774,548: Final Rejection, dated Nov. 23, 2012, 22 pages.

U.S. Appl. No. 12/774,548: RCE and Amendments, dated Feb. 14, 2013, 20 pages.

U.S. Appl. No. 12/774,548: Amendment/Req. Reconsideration-After Non-Final Reject, 23 pages.

U.S. Appl. No. 12/774,548: Final Rejection, dated Jun. 2, 2014, 17 pages.

U.S. Appl. No. 12/774,548: Abandonment, dated Dec. 9, 2014, 2 pages.

* cited by examiner

CONTINUOUS CONTENT REFINEMENT OF TOPICS OF USER INTEREST

CROSS-REFERENCE TO RELATED APPLICATIONS

This application is related to U.S. patent application Ser. No. 12/894,461, filed on Sep. 30, 20210 and entitled "Providing Content to a User From Multiple Sources Based on Interest Tag(s) That Are Included in an Interest Cloud," the entirety of which is hereby incorporated by reference as if fully set forth herein.

This application is also related to U.S. patent application Ser. No. 12/774,548, filed no May 5, 2010 and entitled "Selecting Content Based on Interest Tags That Are Included in an Interest Cloud," the entirety of which is hereby incorporated by reference as if fully set forth herein.

BACKGROUND OF THE INVENTION

Field of the Invention

The present invention relates to techniques for developing topics of user interest.

Background

In a computer networking environment such as the Internet, users commonly use their computers to access computers (e.g., servers) containing resources of content providers on the "World Wide Web" (also known as "the Web") to obtain various types of content (e.g., text, images, video). Users often begin their quests for content by using Web browser software on their computers to access content providers offering content search services. Search services are provided by search engines, which discover and index vast amounts of content available from millions of content providers in order to quickly (e.g., in a fraction of a second) direct users to content believed to be directed to topics of interest to users. Examples of such search engines include Yahoo! Search™ (at http://www.yahoo.com), Microsoft Bing™ (at http://www.bing.com), Google™ (at http://www.google.com), as well as personal search engines, intranet search engines, etc.

Conventionally, users identify topics of interest by manually entering, including cutting and pasting, search terms (e.g., words, phrases, quotes) into a query box of a search engine. User queries contain one or more words/terms, such as "hazardous waste" or "country music," identifying one to many topics of interest. Search engines check received search terms against their content indexes and return a list of links to content deemed relevant to the query. In a Web-based search, the search engine typically returns a list of uniform resource locator (URL) addresses for the relevant documents, which is displayed to the user in a search results page. Users are able to browse and "consume" (e.g., view, read, listen to) the content by selecting or otherwise following the links to content. By consuming the content, users may be able to manually discover additional topics or sub-topics of interest. Users then refine their topics of interest by manually providing different or more detailed search terms, which often results in different links being returned by search engines.

There are numerous problems with this conventional method of manually searching for topics of interest, manually refining searches for topics of interest, and displaying and interacting with content pertaining to topics of interest. Among these problems are, first, both methods are manual and slow. This slow procedure of iterative manual searches is exacerbated by slow network connections. Second, users are generally limited to searching for and reviewing returned links for one topic (represented by one set of search terms) per Web browser page. Users cannot manage a search for multiple topics or subtopics without a plurality of Web browser pages. Third, due to limited time, users may be unable to manually discover and refine their topics of interest. Fourth, when a webpage is gone, so too are the search topics of interest, which forces users to manually start over rather than pick up where they left off in their search for topics of interest.

Thus, systems, methods, and computer program products are needed that address one or more of the aforementioned shortcomings of conventional techniques for searching for topics of interest, refining topics of interest to obtain desired content and interacting with content pertaining to topics of interest.

BRIEF SUMMARY OF THE INVENTION

Various approaches are described herein for, among other things, providing a user interface environment that provides active assistance to discover, investigate, refine and save multiple topics of interest, i.e., a topic incubator and content reviewer where user interests are discovered, quickly developed to maturity and, if desired, preserved for the present viewing experience and, in some embodiments, subsequent topic development and/or content review sessions or viewing experiences. A topic is any expression that can be used to retrieve content, including search results from a search engine. An independent topic interface may be provided for each topic. In each topic interface, users may control topic development by selecting saved topics, dynamically suggested topics and manually entered topics. Suggested topics may be based on a user's saved interests, related interests and/or browsed content. Suggested Topics may differ between topic interfaces and may change with topics. Suggested topics may be continuously refined or updated based on displayed topics. Suggested topics may be updated or refined based on changes in displayed topics by refinement or replacement of topics, selection of suggested topics and consumption of content. Users may control treatment of selected topics individually or as refinements of (combinations with) other topics to create compound topics. Users may replace or refine existing topics in existing topic interfaces or branch off topics into additional topic interfaces. Users may manage and organize interfaces and control sources, types and format of content displayed in each user interface.

An example method is described for providing a user interface that provides an independent topic interface for each of a plurality of topics on one common page displayed to a user. Each topic interface provides a user with an ability to select topics by manual entry, from suggested topics or from saved topics, to select treatment of selected topics as individual or combined with other topics, to select an additional or existing topic interface to display the treated, selected topic and to browse content based on the selected topic displayed in the selected topic interface.

Another exemplary method is described for providing a user interface for a topic of interest displayed to a user. Content based on the topic is provided for display by the user interface. Suggested topics based on the topic are provided for display by the user interface. The suggested topics are updated in response to a selection of content based on the selected content. The suggested topics are updated in response to a selection of a suggested topic based on the selected suggested topic. The suggested topics are updated based on a changed topic in response to a change in the topic of interest other than selection of a suggested topic.

An example system is described that includes a user interface module, content retrieval module, content provider module and topic suggestion module. Some embodiments may further comprise a topic preservation module. These modules may further comprise, interface with or be part of an interest cloud module. The user interface module is configured to provide an independent topic interface for each of a plurality of topics on one common page displayed to a user. Each topic interface is configured to provide a user with an ability to select topics by manual entry, from suggested topics or from saved topics, to select treatment of selected topics as individual or combined with other topics, to select an additional or existing topic interface to display the treated, selected topic and to browse content based on the selected topic displayed in the selected topic interface. The content retrieval module is configured to retrieve content based on each selected topic in each topic interface from one or more content sources. The content provider module is configured to provide the retrieved content for each respective topic interface from one or more sources. The topic suggestion module is configured to suggest topics for each topic in each respective topic interface. The topic preservation module may save topics and associated attributes according to user selections. The interest cloud module may form an integral part of topic development and management and is described in detail in related patent applications incorporated herein by reference.

Content may be obtained from specified or default sources such as search engine results based on a search for a selected topic. Content may be filtered based on specified sources and types of content, which may vary and be controlled by topic and/or interface. Content may be displayed according to a format specified by a user, which may vary between interfaces as well as between different areas in the same interface. Content displayed in existing interfaces may be replaced or refined based on new or refined topics in accordance with user selections. Additional topic interfaces may be provided and populated with content for selected topics in accordance with user selections. Suggested topics may be provided for each topic interface and may be based, for example, on displayed topics, a user's saved interests, related interests and/or browsed content, e.g., content selected by a user. Suggested topics may be based on terms in browsed content or an interest cloud. Thus, suggested topics may differ between topic interfaces and may change with consumed content or with a change in topics. Users may save or discard topics. Saved topics may be ranked in terms of a user's level of interest. Such rankings may be used to display default content for highly ranked interests automatically, such as when a user initially accesses the user interface. Thus, content for saved topics may be automatically and manually selected for display in topic interfaces. User interface controls may permit users to manage each topic interface by arranging, positioning, expanding, shrinking and closing them on the common page.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies. Unless expressly indicated, each figure represents a different embodiment and components in each embodiment are intentionally numbered differently compared to potentially similar components in other embodiments.

Figure 1:
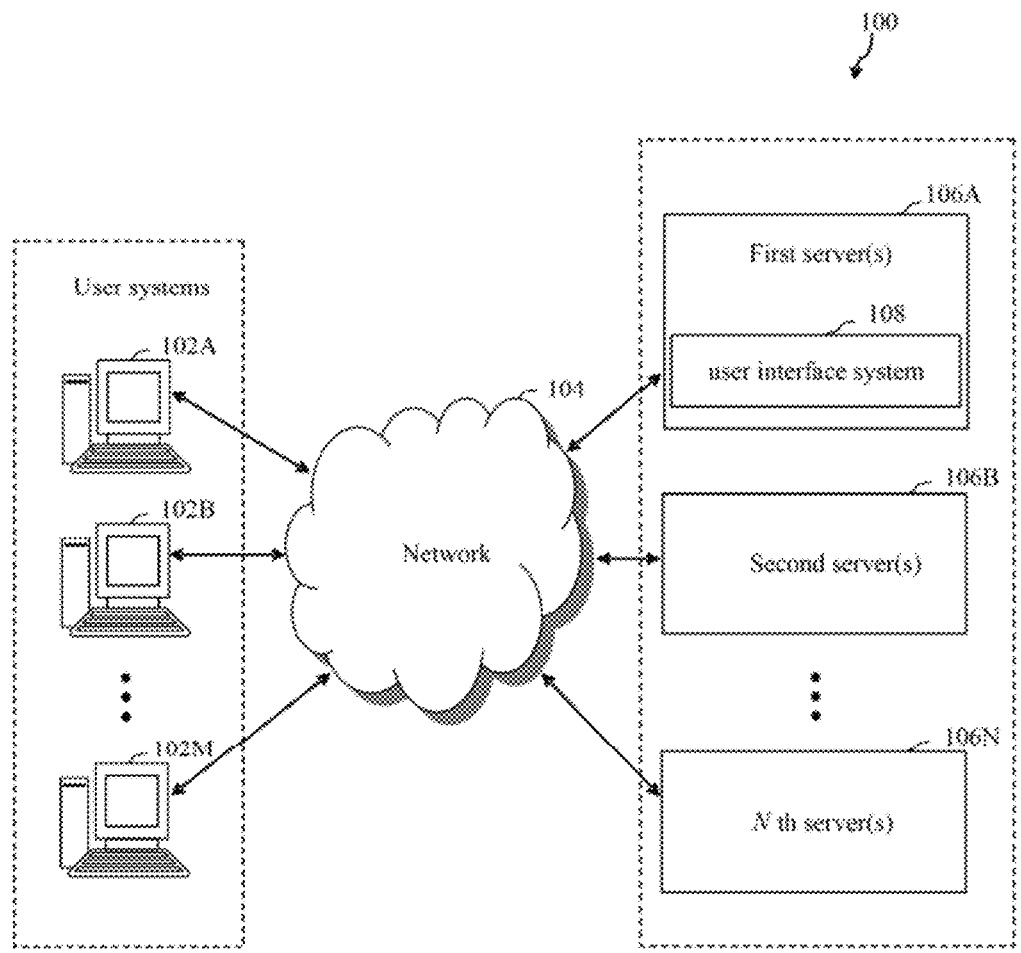
FIG. 1 is a block diagram of an example computer system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments provide, among other things, a user interface environment that provides active assistance to discover, investigate, refine and save multiple topics of interest, i.e., a topic incubator where user interests are discovered, quickly developed to maturity and, if desired, preserved for the present viewing experience and, in some embodiments, subsequent topic development and/or content review sessions or viewing experiences. A topic is any expression that can be used to retrieve content, including search results from a search engine. An independent topic interface may be provided for each topic. In each topic interface, users may control topic development by selecting saved topics, dynamically suggested topics and manually entered topics. Suggested topics may be based on a user's saved interests, related interests and/or browsed content. Suggested Topics may differ between topic interfaces and may change with topics. Suggested topics may be continuously refined or updated based on displayed topics. Suggested topics may be updated or refined based on changes in displayed topics by refinement or replacement of topics, selection of suggested topics and consumption of content. Users may control treatment of selected topics individually or as refinements of (combinations with) other topics to create compound topics. Users may replace or refine existing topics in existing topic interfaces or branch off topics into additional topic interfaces. Users may manage and organize interfaces and control sources, types and format of content displayed in each user interface.

Techniques described herein for providing a user interface environment that provides active assistance to discover, investigate, refine and save multiple topics of interest have a variety of benefits compared to conventional techniques of iterative manual topic development. For instance, the techniques described herein may speed up the process of developing topics of user interest by actively suggesting topic refinements and preserving refined topics of interest for subsequent topic development and/or content review sessions. In each content interface, users are actively and automatically aided with suggested related keywords and extracted keywords extracted from content they are consuming, which aids in the discovery of topics of interest, content of interest and refinement of existing interests by continuously refining the scope of the topics they are consuming content against. Another advantage is an ability to simultaneously pursue many topics and subtopics or content pertaining to selected topics from many different sources organized on one page. Another advantage is preservation of topics as well as sources, types, formats and other presentation details for subsequent topic development and/or content review sessions.

II. Example Embodiments

FIG. 1 is a block diagram of an example computer system 100 in accordance with an embodiment described herein. Generally speaking, computer system 100 operates to provide content to users in response to requests (e.g., hypertext transfer protocol (HTTP) requests) that are provided by the users. The content may include web pages, images, videos, other types of files, output of executables, etc. and/or links thereto. In accordance with example embodiments, computer system 100 is configured to provide continuous content refinement of topics based on user topics of interest.

As shown in FIG. 1, computer system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are computers or other processing systems, each including one or more processors, that are capable of communicating with servers 106A-106N. User systems 102A-102M are capable of accessing sites (e.g., web sites) hosted by servers 104A-104N, including search engine web sites, so that user systems 102A-102M may access content that is available via the sites, including search results. User systems 102A-102M are configured to provide requests (e.g., hypertext transfer protocol (HTTP) requests) to servers 106A-106N for requesting content stored on (or otherwise accessible via) servers 106A-106N. For instance, a user may initiate a request for content using a client (e.g., a web crawler, a web browser, a non-web-enabled client, etc.) deployed on a user system 102 that is owned by or otherwise accessible to the user.

Servers 106A-106N are computers or other processing systems, each including one or more processors, that are capable of communicating with user systems 102A-102M. Servers 106A-106N are configured to host respective sites (e.g., web sites), so that the sites are accessible to users of computer system 100. Servers 106A-106N are further configured to provide content to users in response to receiving requests (e.g., HTTP requests) from the users.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a laptop computer, a tablet computer, a personal digital assistant, a cellular telephone, etc. It will be recognized that although some operations are described herein as being performed by a user for ease of discussion, such operations may be performed by a respective user system 102 or by user interface system 108 in response to an instruction that is received from the user.

As illustrated in the embodiment shown in FIG. 1, first server 106A comprises a user interface system 108. It will be recognized that any one or more of servers 106 and/or user systems 102 may include user interface system 108. In other embodiments, user interface system 108 may be implemented in a plurality of servers 106, in one or more user systems 102 or on both user systems 102 and servers 106. In one non-limiting embodiment, user interface system may be implemented as a combination of website operations combined with a webpage downloaded and executed by web browser software on user systems 102. In another non-limiting embodiment, user interface system 108, at least in part, may be implemented within a browser, which interacts with other components of user interface system 108 on one or more servers 106. Suffice it to say that there are numerous feasible implementations of user interface system 108.

In non-limiting related embodiments, user interface system 108 may be implemented by or in cooperation with an interest cloud module as described in U.S. patent application Ser. No. 12/894,461, filed on Sep. 30, 20210 and entitled "Providing Content to a User From Multiple Sources Based on Interest Tag(s) That Are Included in an Interest Cloud," the entirety of which is hereby incorporated by reference as if fully set forth herein, and U.S. patent application Ser. No. 12/774,548, filed no May 5, 2010 and entitled "Selecting Content Based on Interest Tags That Are Included in an Interest Cloud," the entirety of which is hereby incorporated by reference as if fully set forth herein. As explained in the incorporated patent applications, an interest cloud module, like a search engine, is configured to retrieve content from source(s). Other embodiments of the invention may be implemented without an interest cloud module, such as an embodiment pertaining only to topics specified in search engine queries. However, even an embodiment pertaining only to topics specified in search engine queries may be implemented in or in cooperation with an interest cloud module. For example, in some embodiments, one or more suggested topics may be generated from an interest cloud.

As used herein, a topic is any interest from an interest cloud and any search query or other expression that can be used to locate content on one or more sources. As used herein, content is any content provided by any source, including search results provided by a search engine. Thus, a web site providing a search engine such as Yahoo! Search is a content provider. In some embodiments, a search engine such as Yahoo! Search may be the default source of content when an interest or query is not associated with a specified source of content.

Content may be stored on sources such as first server(s) 106A, on a user system 102 of the user, and/or elsewhere, such as servers 106B-106N and other computers (not shown) on network 104. Content may include web pages, images, videos, other types of files, output of executables, etc. and/or links thereto. Each web page, image, video, etc. is referred to as a content element. Examples of a source from which the content may be retrieved include but are not limited to a web site (e.g., a blog, a search engine), a social update stream of a user or of a person who is included in an affinity set of the user, a search click log of the user, a newsfeed, a network with which the user is associated (e.g., a social network), etc.

Figure 2:
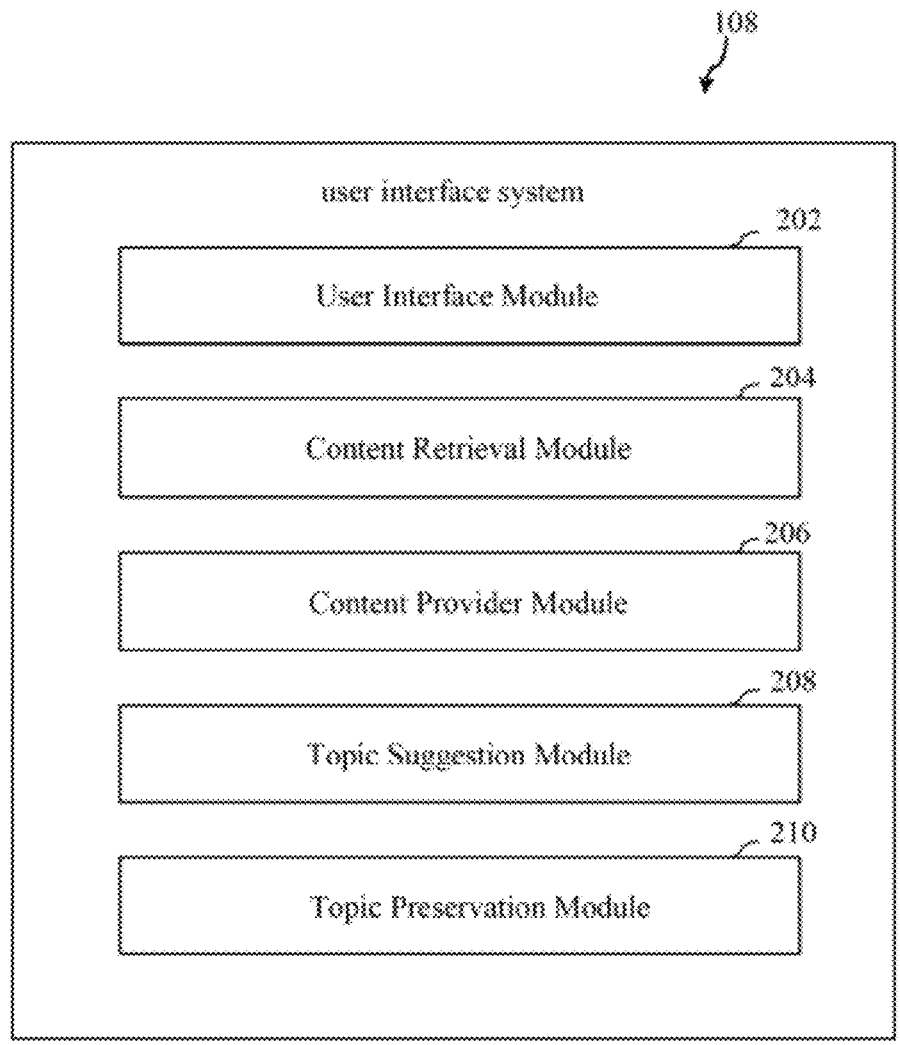
FIG. 2 is a block diagram of an example implementation of a user interface system shown in FIG. 1 in accordance with embodiments described herein.
Figure 3:
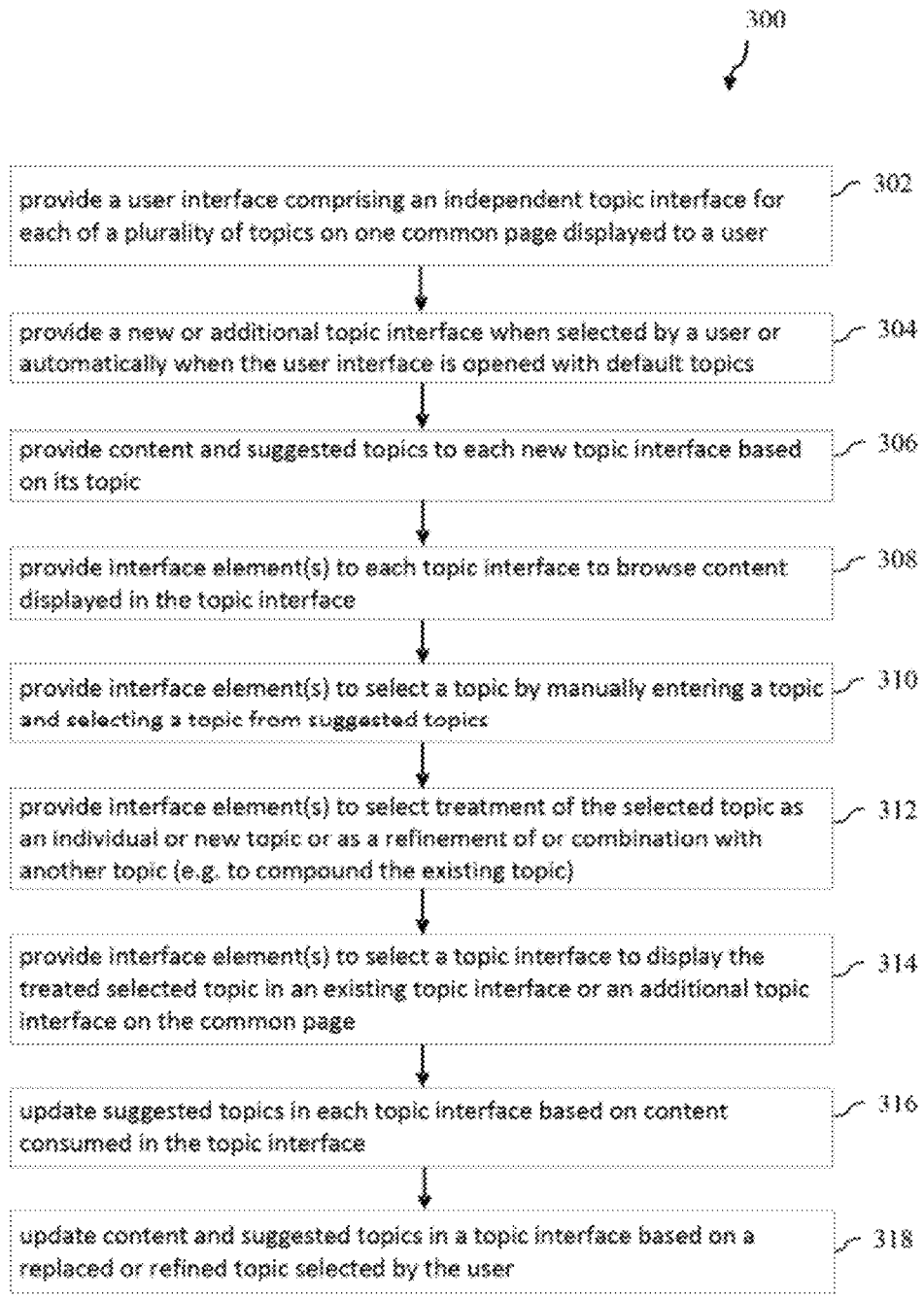
FIG. 3 is a flowchart of an example method of providing a user interface in accordance with embodiments described herein.

For purposes of illustration, FIGS. 2-12 are discussed together. Following introduction of each of FIGS. 2, 3 and 4, embodiments of the invention are discussed with reference to steps presented in the embodiment shown in FIG. 3. Exemplary implementation of steps in FIG. 3 will be pointed out with reference to modules in FIG. 2 and the user interface and user interactions shown in FIGS. 4-12. Some features and interactions shown in FIGS. 4-12, as well as other features and interactions not shown in FIG. 3, are identified as alternative embodiments.

FIG. 2 is a block diagram of an example implementation of a user interface system shown in FIG. 1 in accordance with embodiments described herein. As shown in FIG. 2, one embodiment of user interface system 108 includes user interface module 202, content retrieval module 204, content provider module 206, topic suggestion module 208 and topic preservation module 210. Further structural and operational embodiments will be apparent to persons skilled in the relevant art(s) based on the discussion regarding method 300 shown in FIG. 3 and an example user interface and interaction therewith shown in FIGS. 4-12. Some embodiments may include integration in or cooperation with block diagrams of interest cloud modules in the incorporated patent applications.

FIG. 3 is a flowchart of an example method 300 of providing a user interface in accordance with embodiments described herein. The steps in method 300 may be implemented, for example, by computer system 100 and, more specifically, by user interface system 108 deployed within computer system 100, as shown in and discussed relative to FIGS. 1 and 2.

Figure 4:
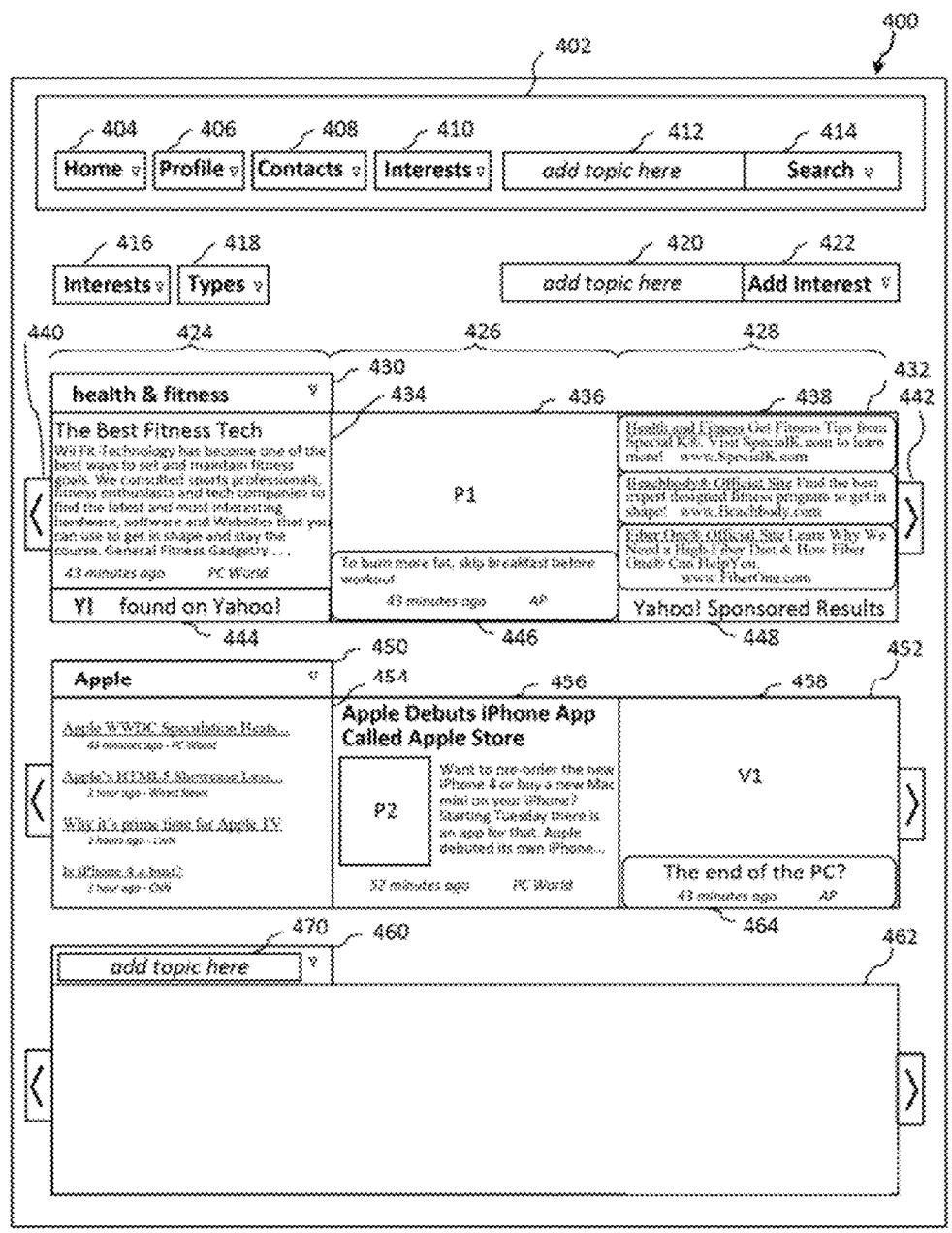
FIGS. 4-12 show an example implementation of a user interfaces and user interaction with it in accordance with embodiments described herein.

FIGS. 4-12 show an example implementation of a user interface and exemplary user interaction with the interface in accordance with embodiments described herein. Generally, FIG. 4 shows an example page or display presented to a user comprising a user interface with three topic interfaces, two of which have topics and are supplied with three types of content, e.g., text, images and videos. Also, as generally shown in the difference between FIGS. 4 and 5, in this particular embodiment, topic suggestions are not shown unless an input device, such as a mouse cursor, is used to provide input, such as by moving the cursor to a particular location.

As shown in FIG. 4, page 400 may represent, for example, a web page provided by a web site operator. Page 400 includes page control interface 402. In this example, page control interface includes page control interface elements home 404, profile 406, contacts 408, interests 410, search 414 and search box 412. In other embodiments, there may be more, fewer or no page control interface elements. With these page control interface elements, a user may control what is shown on page 400 as a whole. Incidentally, each interface element has an upside down triangle element to indicate, for example, that the interface element is a multipurpose interface, e.g., one that provides a drop down menu of operations. Such menus may be used, for example, to permit the user to specify a particular or more specific action, such as display format of content provided for display. If a user selects home 404, for example, a home page of the user on the website may be shown. If a user selects profile 406, for example, the user's profile information page on the website may be shown. If a user selects contacts 408, for example, the user's contacts page may be shown. As shown in FIG. 4, a user has selected interests 410, resulting in display of the user's interests page displaying topic interfaces, content elements and other interface elements shown below page control interface 402. If a user enters a search topic in search box 412 and selects search 414, for example, a search page with search results may be shown below page control interface 402 following a search of a WebCrawler index of Internet content based on the search topic. In some embodiments, selection of search 414 may also present search queries and results or content in topic interfaces as shown for interests. For example, in some embodiments, selecting search 414 may provide a menu of options to a user, including an option to display a traditional search page with only one search interface below page control interface 402 and another option to deploy the user interface format shown for interests, where there can be a plurality of search topic interfaces. In other embodiments, topic interfaces shown on page 4 may comprise a mixture of topics searched for using search 414 and add interest 422. Thus, although the embodiment shown in FIG. 4 shows an interests page 402 based on a user's selection of interests 410, this example applies equally well to all topics regardless whether entered in search box 412 or interest box 420.

Interests page 402 includes an interest interface element (e.g. button) 416, a types button 418, an entry element 420, an add button 422 and interface elements also referred to as topic interfaces 432, 452 and 462. There may be more or fewer topic interfaces. Topic interfaces 432, 452 and 462, perhaps among others, may be opened automatically or manually opened by user selection. For example, one or more topic interfaces may open automatically when a user initially selects interests 410. This may occur, for example, based on the user's profile and/or saved interests, which may be ranked in level of importance to the user.

A user may select the interests button 416, for example, to gain access to saved interests, e.g., in a menu or in a separate page (e.g., a web page). In some embodiments, as shown, interests 416 may be a multi-purpose interface element providing a user with options. One exemplary option may be to select a saved topic of interest to open in a topic interface. Another option may be to delete a saved topic of interest. Another exemplary option may be to modify interest tags (and/or attributes thereof) that are included in an interest cloud of the user. For instance, an attribute of an interest tag may be a priority of the interest tag, type(s) of content associated with the interest tag, etc. Interest clouds are discussed in greater detail in the patent applications incorporated by reference herein.

The user may select the types button 418 to change the types of content that may be retrieved and/or provided. Content type selection may be applied generally, without regard to any particular topic (e.g., interest) or topic interface, or specifically to particular topics or topic interfaces. These various options may be selectable, for example, in a menu when types 418 is a multi-purpose interface element. For example, the user may designate that only images are to be provided to the user. In another example, the user may designate that images and social update elements are not to be provided to the user. In yet another example, the user may designate that only videos and news articles are to be provided to the user. In other examples, a user may specify that only links to content, or links with small captions, may be shown. Although, in this embodiment, types 418 is shown as a universal tool for all topic interfaces, in other embodiments content types may be controlled for each topic interface.

A user may type a topic of interest into the entry element 420 and select the add button 422. In some embodiments, this may add a topic interface to display content for the topic (e.g., interest). In other embodiments, selecting add button 422 may add an interest tag to the user's interest cloud without adding a topic interface. In other embodiments, selecting add interest 422 may do both. In some embodiments, such as the one shown, add interest 422 may be a multi-purpose interface providing a plurality of options such as these. An additional exemplary option could be, in lieu of manually adding an interest, an import option to gain access to a page to import interest tags from source(s) and to select a subset of the interest tags upon which content that is provided to the user is based. Additional options may include specifying a variety of content search conditions such as source, type of content to search for, region to search in, etc.

In some embodiments, by either selecting add interest 422 or selecting an option in a menu from add interest 422, a user may be able to specify one or more sources to search for the topic of interest entered into topic box 420. In the event sources are not selected, there may be a default source, such as a search engine. In this sense, entering a topic in box 420 and selecting add interest 422 may operate the same as entering a topic in search box 412 and selecting search 414. This would allow a user to effectively use the interests page 402 to provide a plurality of search topic interfaces if a search page didn't provide the same feature.

First interface element or topic interface 432 includes first content that is based on a "health and fitness" interest tag, as indicated by tab 430. Second topic interface 452 includes second content that is based on an "Apple" interest tag, as indicated by tab 450. Third topic interface 462 does not include any content, although it could, for example, provide content such as one or more advertisements. Instead of an interest tag, third tab 460 comprises a topic input box 470 to permit direct manual entry of a topic into existing topic interface 462, which would result in content based on the topic being displayed in third topic interface 462. In one embodiment, each of the first, second, and third content may be based on one or more interest tags that correspond to one or more topics of interest of the user. In other embodiments, the content may be based on search topics. In other embodiments, the content may be based on a mixture of interest tags and search topics.

As indicated, tabs 430, 450 and 470 may be a multi-purpose interface elements. For example, by selecting or moving an input element such as a mouse cursor over tab 430, a menu of options may appear. These options could include, for example, an option to specify the format of content displayed for a topic, such as health & fitness. As shown, the format of content displayed in each of the first and second interface topics 432 and 452 is three content columns 424, 426 and 428, which is shown only for illustrative purposes and is not intended to be limiting. It will be recognized that the format of content in topic interfaces may be arranged in any suitable manner, including any number of columns, any number of rows, particular types of content or a mix of content in each or any other imaginable format. Display formats may be the same or different for each topic interface. Another option could be to specify the type of content to display in the topic interface. Another option may be to specify a font size or type to use for text. Another option may be to specify whether to show and what amount of caption to provide with links to content. Another option may be to specify what user interfaces to show, e.g., horizontal scroll bars, vertical scroll bars, vertical or horizontal page selectors. Other options include shrinking, expanding and closing a topic interface. Other options may include how to respond to selections of content, e.g., whether to open a new page for viewing and/or listening to selected content. Another option may be to specify where to open additional topic interfaces spawned from the present topic interface. These are only a few of many potential options a user can specify in each topic interface or for all topic interfaces to have the same universal functionality and performance.

As shown in this example, each of the topic interfaces 432, 452 and 462 includes horizontal browsing elements 440 and 442, which enable the user to browse through the respective content displayed in topic interfaces 432, 452, 462. Accordingly, interface elements or topic interfaces 432, 452 and 462 are effectively browser elements that permit content browsing. Each browsing element 440 enables the user to browse to the left through respective content, and each browsing element 442 enables the user to browse to the right through the respective content. Content may be browsed, viewed, selected or consumed by using interface elements, e.g., a link, a browse element such as a scrolling element or a "next" button. Any number of interface elements may be used and they may vary between embodiments as well as between users.

For purposes of non-limiting illustration, the first content in first column 424 of first topic interface 432 includes content 434 consisting of a link to and snippet of an article, as indicated, "The Best Fitness Tech." Content 434, as indicated, was published 43 minutes earlier on PC World's web site. Source indicator 444 indicates content 434 is provided by (sourced from) the Yahoo!® network. For example, content 434 may be provided as a search result based on a search query of "health & fitness" with respect to a Yahoo!® search engine. The first content 436 in second column 426 of first topic interface 432 includes a picture P1 and a caption 446 that provides a title, "To burn more fat, skip breakfast before workout," of the picture P1 and indicates that the picture P1, which may be a selectable link to the article including the picture, was posted 43 minutes ago by the Associated Press (AP). Although not shown, an action element may accompany content or pop-up to provide selectable options related to the content, such as, view, share, save and remove. The user may select (e.g., click on) the view, share, save, and/or remove options to respectively view the content, share the content with at least one person, save the content, and/or remove the content from the first content. The first content 438 in third column 428 of first interface element 438 includes three links to advertising content as indicated by source indicator 448.

The first content that is provided in first topic interface 432 is shown to be aggregated from at least three different sources (i.e., Yahoo!®, sponsored results and Associated Press®) for illustrative purposes and is not intended to be limiting. It will be recognized that content that is provided in a topic interface (e.g., the first content in first interface element 432) may be provided from a single source or any number of sources by default or as indicated by a user.

The second content 454 in first column 424 of second interface element 452 includes links to four articles about Apple®. In this example, no captions are provided for the links. However, a source indicator is provided under each link to indicate the various sources of the articles, including PC World®, Wired News® and CNN®. The second content 456 in second column 426 of second interface element 452 includes a link to an article, "Apple Debuts iPhone App Called Apple Store," along with a picture P2 that pertains to the article, and a source indicator that it was published 52 minutes ago on PC World®. The second content 458 in the third column 428 of second topic interface 452 includes a first video V1 and a caption 464, "The end of the PC?" with a source indicator indicating first video V1 was published 43 minutes ago by the AP.

The example content (e.g., content elements), sources and other information accompanying content described with respect to FIGS. 4-12 are provided for illustrative purposes and are not intended to be limiting. The content in each topic interface may include any suitable content elements from any suitable source(s). Further, in various embodiments, the format of content and type of content displayed in each topic interface may vary between embodiments and may be based on fixed settings, random settings, periodic settings, default settings and/or user-selected settings. For example, a web page provider may need to provide a certain amount of advertising, which may be periodic and may periodically override a user's settings.

As shown in the flowchart of FIG. 3, the method 300 begins at step 302. In step 302, there is provided a user interface comprising an independent topic interface for each of a plurality of topics on one common page displayed to a user. Step 202 may be implemented, for example, by user interface module 202 in FIG. 2. One example of step 202 is provided in FIG. 4, which shows a user interface comprising an independent topic interface (e.g., 432, 452, 462) for each of a plurality of topics (e.g., "health & fitness" and "Apple®") on one common page 400 displayed to a user (not shown). In some embodiments, a web browser (not shown) operating on a client computer 102 may download a web page 400 that includes the user interface in the form of style sheets and client-side scripts (not shown) executed by the web browser on client computer 102. In other embodiments, part or all of the user interface may be implemented in the browser software.

In step 304, there is provided a new or additional topic interface when selected by the user or automatically when the user interface is opened with default topics. Step 304 may be implemented, for example, by user interface module 202 in FIG. 2. Topic interfaces 432, 452 and 462 shown in FIG. 4 may have been opened automatically when the user selected page 400, e.g., by selecting interests 410. Topics "health & fitness" and Apple may be the highest rated or ranked interest tags in user's interest cloud (not shown). The user may have configured interests page 400 to open with the two most highly ranked topics in two topic interfaces 432, 452 plus a third topic interface 462 for direct entry of a topic of interest. Topics displayed automatically in topic interfaces may be default or randomly selected topics. Alternatively, or in combination with automated provision of topic interfaces, the user may have manually selected one or both topics "health & fitness" and Apple from saved topics or by entering these topics into topic entry box 420 and selecting add interest 422, which resulted in the provision of topic interfaces 432 and 452 on common page 400.

Figure 6:
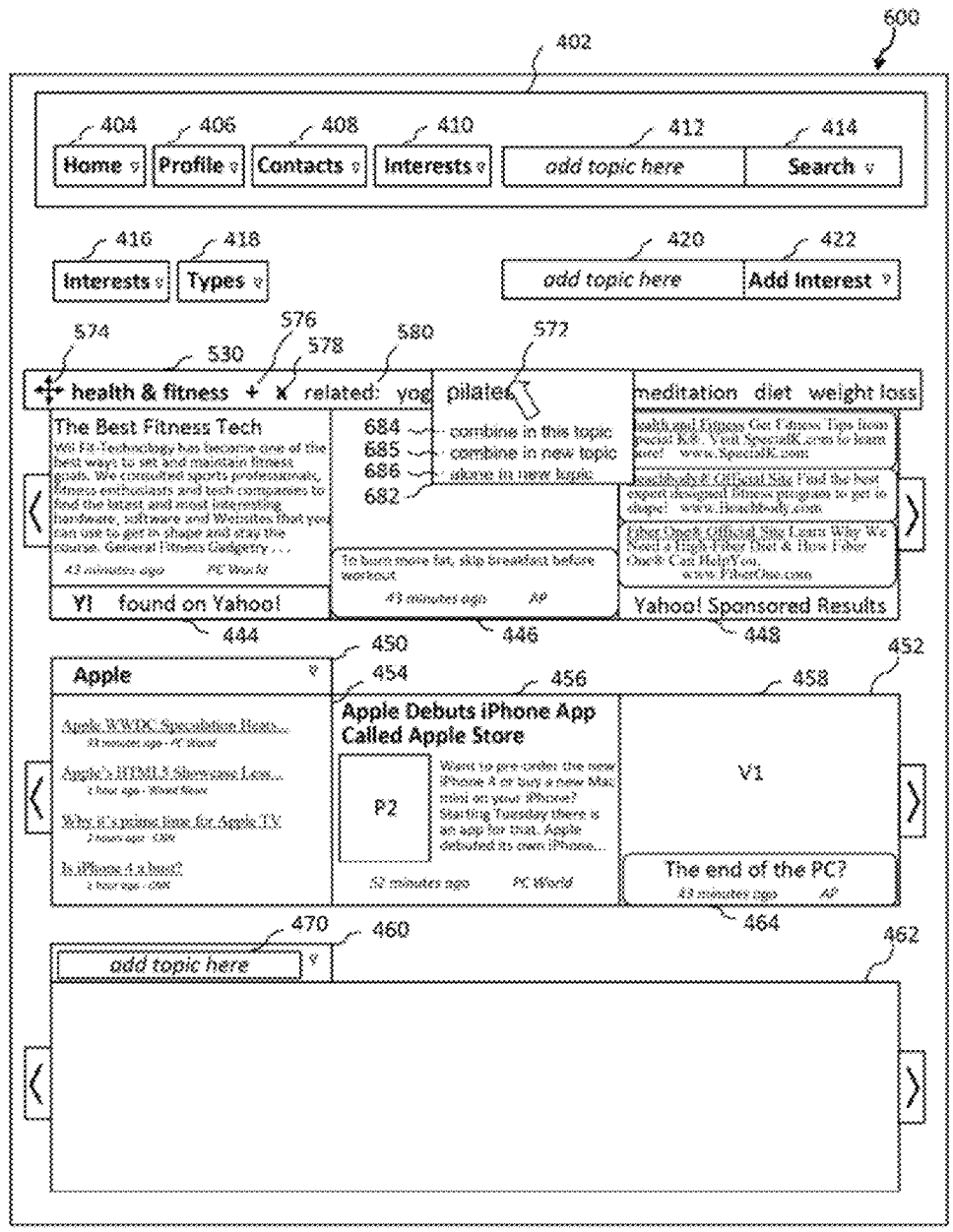
Figure 8:
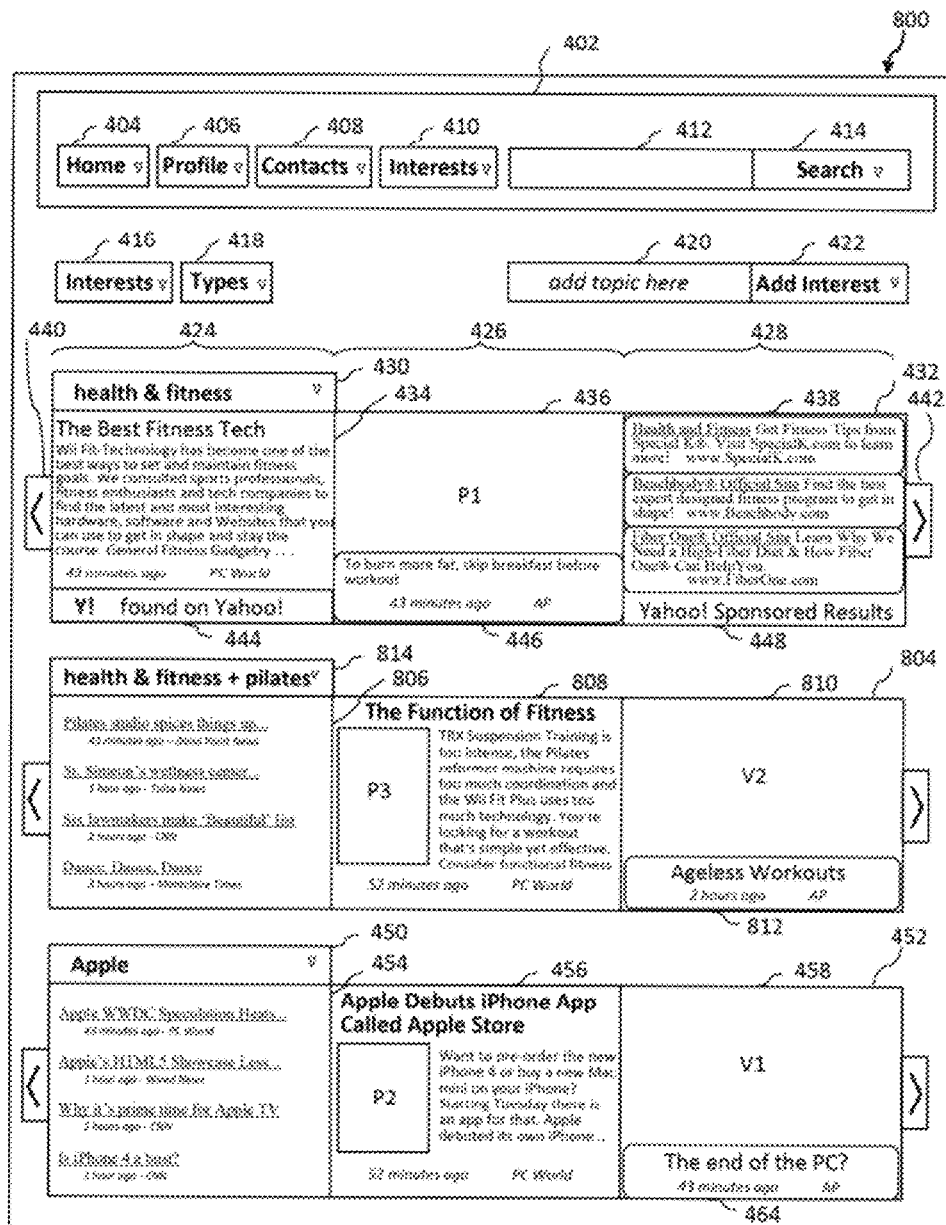
Figure 9:
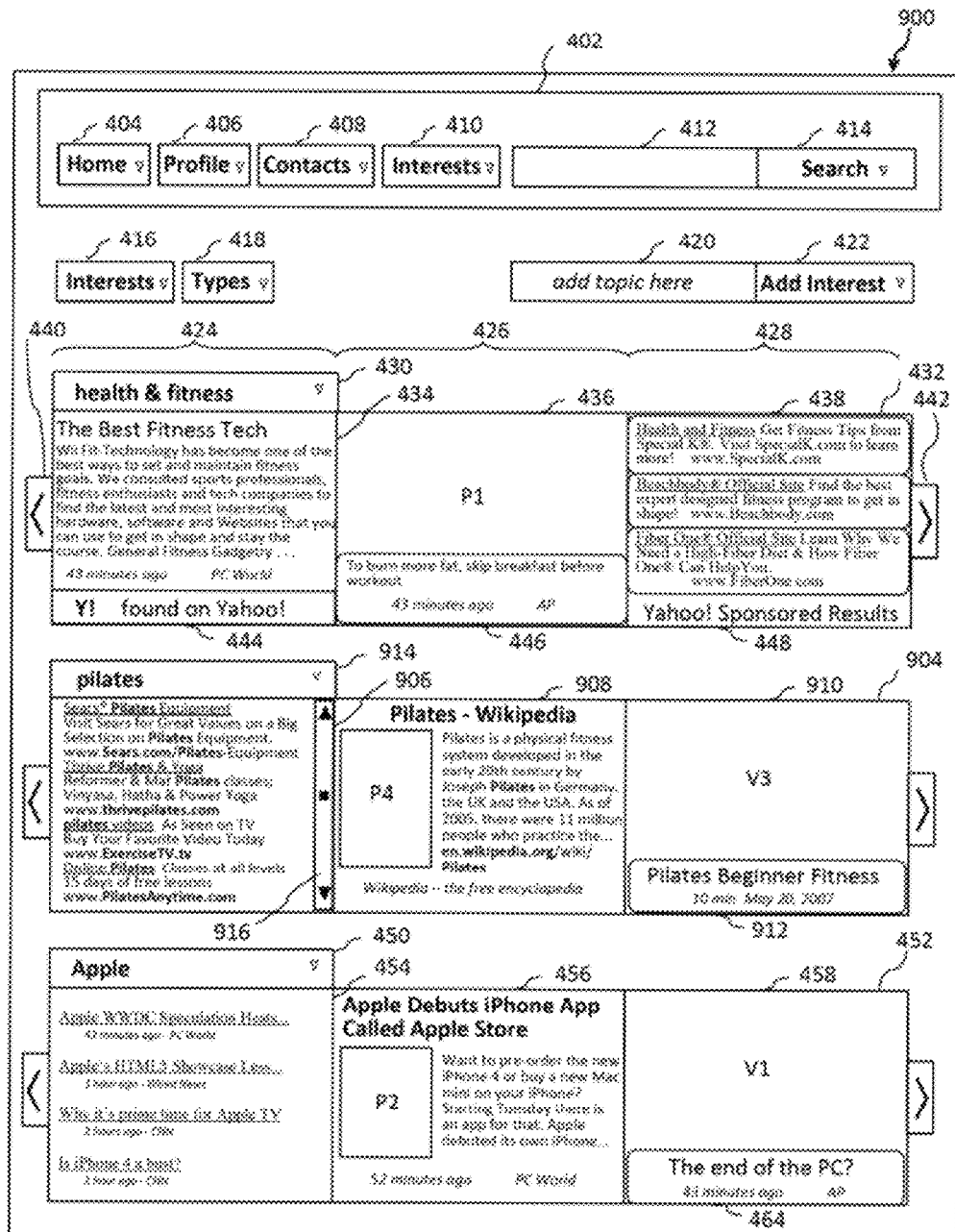

Topic interfaces 804 in FIG. 8 and 904 in FIG. 9 illustrate the addition of topic interfaces 804, 904 in response to a selection by a user, e.g., selections of second 685 and third option 686 respectively in menu 682 shown in FIG. 6. Topic interfaces 804 and 904 are not present in FIG. 6. As shown by FIG. 8, topic interface 804 with the tab 814 labeled "health & fitness+pilates" is added to common page 600 in response to selection of second option 685 "combine [pilates with health & fitness] in new topic [interface]." As shown by FIG. 9, topic interface 904 with tab 914 labeled "pilates" is added to common page 600 in response to selection of third option 686 "[display pilates] alone in new topic [interface]."

User interface module 202 may implement all functionality for the user interface, including all settings and adjustment of interface elements in accordance therewith. User interface module 202, wherever it may be located, may process interface management tasks such as adding, resizing, minimizing, expanding and closing topic interfaces.

In step 306, there is provided content and suggested topics to each new topic interface based on its topic. Step 306 may be implemented, for example, by content retrieval module 204, content provider module 206 and topic suggestion module 208. For example, with regard to the provision of content, content retrieval module 204 may retrieve content from one or more sources, which may be default or identified sources based on a selected topic. Upon retrieving the content, content provider module 206 may provide the retrieved content for display in the relevant topic interface. In some embodiments, content provider module 206 may edit and/or filter retrieved content to match specified parameters for content type and display format. For example, content may need to be trimmed or cropped to fit in the display format selected by the user. In other embodiments, there may be dedicated editing, formatting and/or filter modules (not shown) to serve these purposes. As shown in FIG. 4, content 434, 436, 438 based on the topic "health & fitness" is provided to topic interface 432 with tab 430 labeled for topic "health & fitness." Likewise, content 454, 456, 458 based on the topic Apple® is provided to topic interface 452 with tab 450 labeled for topic Apple®. No content is provided to topic interface 462 because it is awaiting entry of a topic. Similarly, as shown in FIG. 8, content 806, 808 and 810 with caption 812 based on the topic "health & fitness+pilates" is provided to new or additional topic interface 804 with tab 814 labeled for topic "health & fitness+pilates." As shown in FIG. 9, content 906, 908 and 910 with caption 912 based on the topic "pilates" is provided to new or additional topic interface 904 with tab 914 labeled for topic "pilates."

Figure 5:
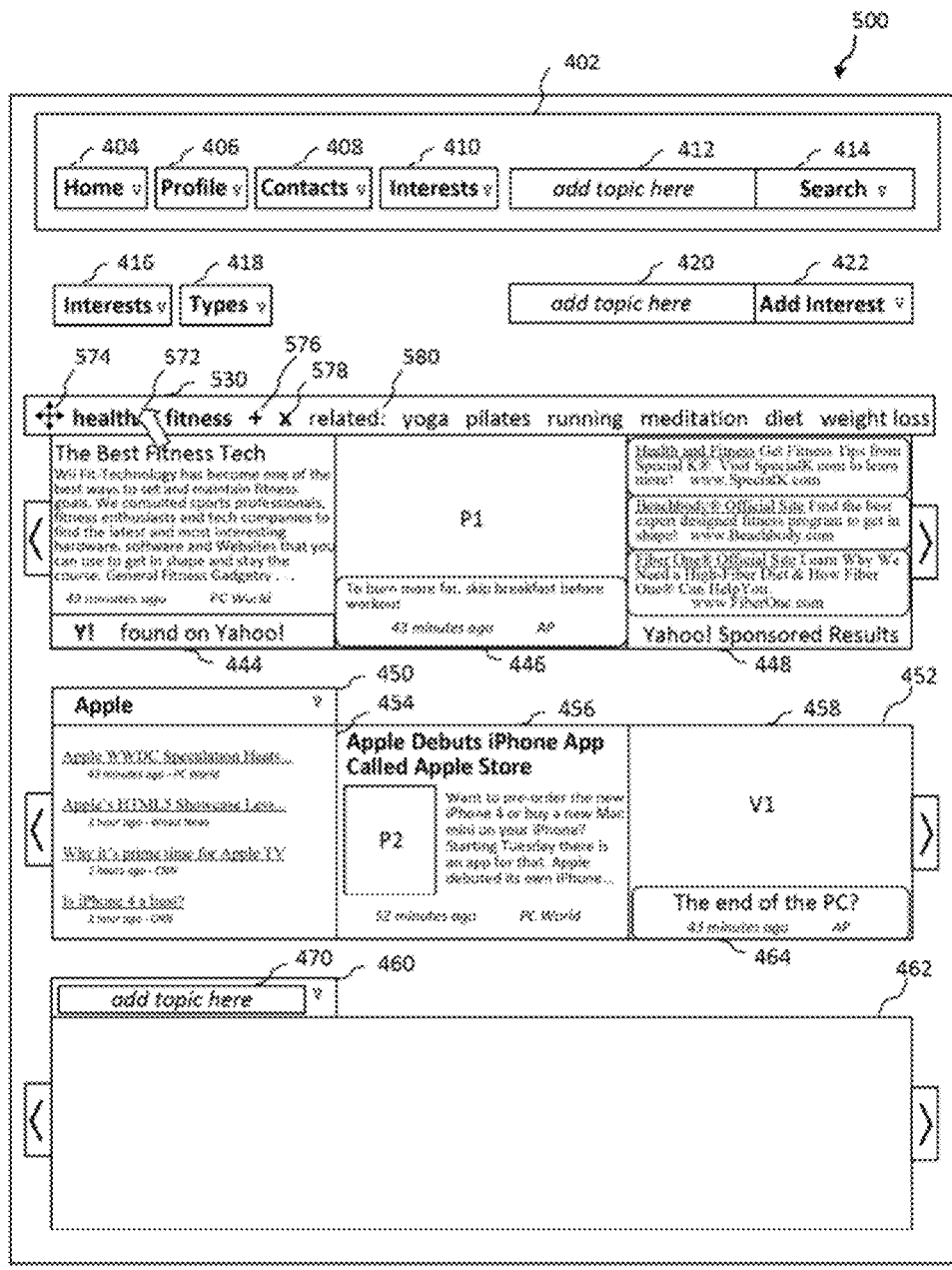

Topics suggested may be based on one or more topics of interest. Topics suggested for one topic interface may be suggested independent of topics suggested for another topic interface. In some embodiments, topics suggested for one topic interface may be dependent upon topics suggested for another topic interface. Suggested topics are provided, e.g., by topic suggestion module 208. In some embodiments, such as the embodiment shown in FIGS. 4-12, suggest topics are not shown (i.e. they are hidden). Information such as suggested topics may be hidden until it is of interest, for example, to avoid cluttering the user interface. FIGS. 5 and 6 show the suggested topics while FIGS. 4 and 7-12 do not show (hide) suggested topics. In some embodiments, additional interfaces, content, suggested topics and other information may be hidden and displayed based on user interaction, such as using an input device (e.g., mouse, human hand) to point (e.g., using mouse cursor, using finger) to a particular position such as an interface element, with or without selection (e.g., clicking, tapping). An example of this is provided in FIG. 5, which shows that when a user positions cursor 572 over tab 430, or more particularly the topic "health & fitness," menu 530 appears with additional interface elements (reposition icon 574, combine topic icon "+" 576 and close topic interface "X" 578) and related or suggested topics 580. The additional interface elements and information shown in FIG. 5 is exemplary and non-limiting. In other embodiments, more or fewer interface elements and/or information may be provided in response to user input, which may include many other types of input beyond moving a cursor and/or clicking. As indicated in the example shown in FIG. 5, the suggested topics provided include, but may not be limited to, yoga, pilates, running, meditation, diet and weight loss. More or fewer suggested topics may appear initially or in response to additional user interaction.

Figure 10:
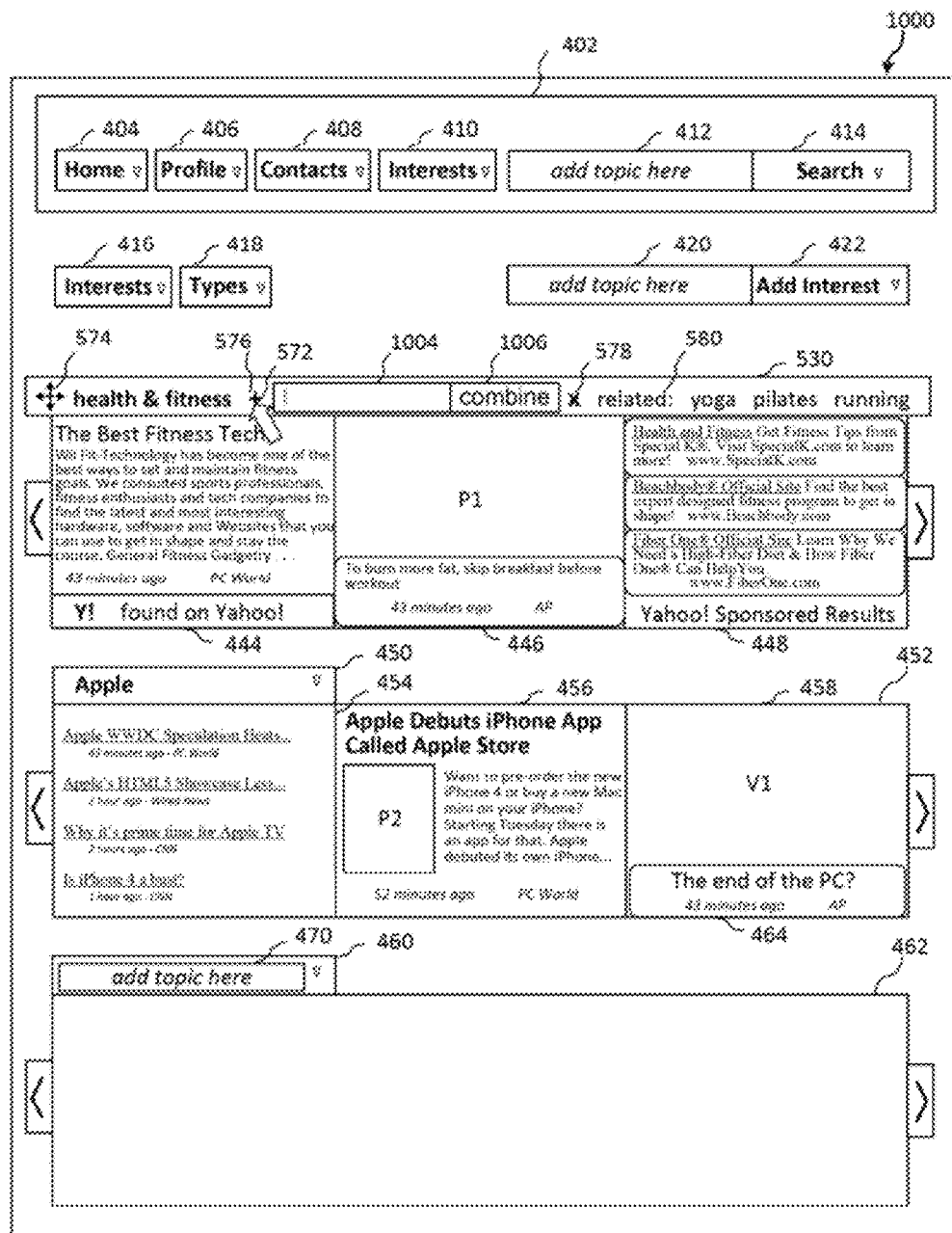

Hidden information may also be nested or layered. This is shown, for example, in FIGS. 6 and 10. As shown in FIG. 6, once hidden menu 530 is shown, moving cursor 572 over any suggested topic, such as "pilates," results in display of previously hidden menu 682 with several options. The number and type of options is illustrative and non-limiting. There may be any number and type of options in a wide variety of embodiments. As shown in FIG. 10, once hidden menu 530 is shown, moving cursor 572 over combine topic icon "+" 576 results in display of previously hidden topic entry box 1004 and combine interface (e.g., button) 1006. The extent of layering of hidden information may vary from one embodiment to the next.

In step 308, there is provided interface element(s) to each topic interface to browse content displayed in the topic interface. Step 308 may be implemented, for example, by user interface module 202 and/or content provider module 206 depending on the location and type of an interface element. As shown in FIGS. 4, 8 and 9 for example, each topic interface 442, 452, 462, 804 and 904 is provided with content browser elements 440, 442. A user may also interact with tagged content or links, such as the linked content provided by content provider module 206 in each of three columns of content 434, 436, 438 in the first topic interface 432, each of the three columns of content 454, 456, 458 in the second topic interface 452, each of the three columns of content 806, 808, 810 in the new topic interface 804 and in each of the three columns of content 906, 908, 910 in the new topic interface 904. Upon selecting content by selecting tagged content or a link, depending on the embodiment and/or depending on user settings or automated response, selected content may be displayed in the confines of the topic interface in which it appears, an expanded topic interface and/or a new page. Thus, content may be displayed and browsed or selected and browsed in numerous ways. There are many types of browsing elements besides horizontal browsing elements. As one additional example, a vertical scroll bar such as interface element 916 in topic interface 904 in FIG. 9 also enables browsing. Further, browsing essentially means consuming content. Video and audio content are consumed by playing them, such as in a media player. Selecting audio and/or video content, in some embodiments, may result in a media program playing the selected content in a separate interface or within the interface in which the content appeared. A media player may also display pictures, where viewing is browsing or consuming the picture content.

In step 310, there is provided interface element(s) to select a topic by manually entering a topic and selecting a topic from suggested topics. Step 310 may be implemented, for example, by user interface module 202, content provider module 206 and/or topic suggestion module 208 depending on the location and type of an interface element. For example, as shown in FIG. 10, topics may be manually entered in topic box 420, 470 and 1004 and submitted by selecting, respectively, add interest 422 or an option from its menu, an "enter" key on a keyboard or an option from menu for tab 460 and combine 1006, all of which manual entry methods may be provided, for example, by user interface module 202. Also, as shown in FIGS. 5 and 6, topics may be selected by selecting a topic from suggested topics shown in menu 530 and/or 572. Although not shown, topics may also be selected from saved topics. For example, a user may select a saved topic by selecting interests 416 and selecting a particular saved topic in a menu (not shown). Topics may be saved or preserved, either for a particular viewing session or for subsequent viewing sessions, by topic preservation module 210. In some embodiments, topic preservation module 210 may be, just as other modules 202-208 and user interface system 108 as a whole may be, part of or in communication and cooperation with an interest cloud module (not shown). In some embodiments, one or more suggested topics may be generated from an interest cloud. Topics may be automatically or selectively preserved and otherwise managed by topic preservation module 210. For example, selection of add interest 422 may automatically preserve a topic of interest. Interface elements, such as interests 416, may be provided to manually manage topic preservation. Attributes may be associated with topics. Topic attributes may comprise, for example, one or more sources of content associated with a topic, one or more types of content associated with a topic and content display formats associated with a topic. Attributes associated with topics may vary between topics. Topic attributes may be managed, including selected, changed, added, deleted, etc. Some interface elements may permit automated or optional selection of whether to save or not save (e.g., discard) topics of interest. For example, add interest 422 may automatically save or provide an option to save or not save a topic entered in topic entry box 420 while topic entry box 470 may not automatically save or provide an option to save or not save a topic entered therein.

In step 312, there is provided interface element(s) to select treatment of the selected topic as an individual or new topic or as a refinement of or combination with another topic (e.g., to compound the existing topic). Step 312 may be implemented, for example, by user interface module 202 and/or content provider module 206. For example, as provided by user interface module 202, a topic may be manually entered in topic box 420, 470 and 1004 and submitted by selecting, respectively, add interest 422 or an option from its menu, an "enter" key on a keyboard or an option from a menu for tab 460 or combine 1006. Depending on the embodiment, e.g., whether user interface elements are multi-purpose interface elements offering numerous options, these interface elements may be used to select treatment of a manually entered topic as an individual or new topic displayed in a new or existing interface or as a refinement of or combination with another topic, e.g., to compound an existing topic. As illustrated in the embodiment shown in FIGS. 4-12, a topic selected through manual entry in entry boxes 420 or 470 may be treated as an individual or new topic.

Figure 11:
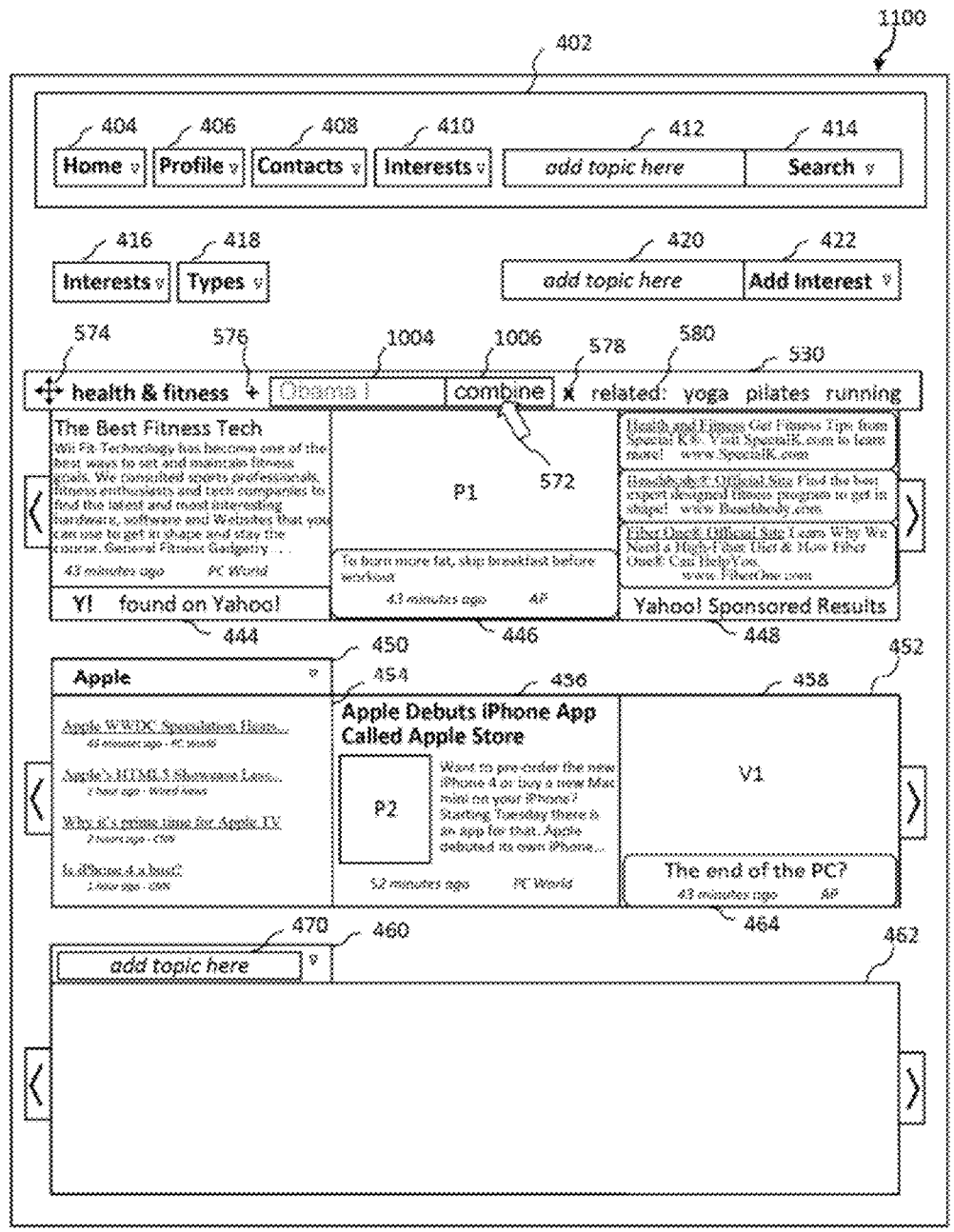
Figure 12:
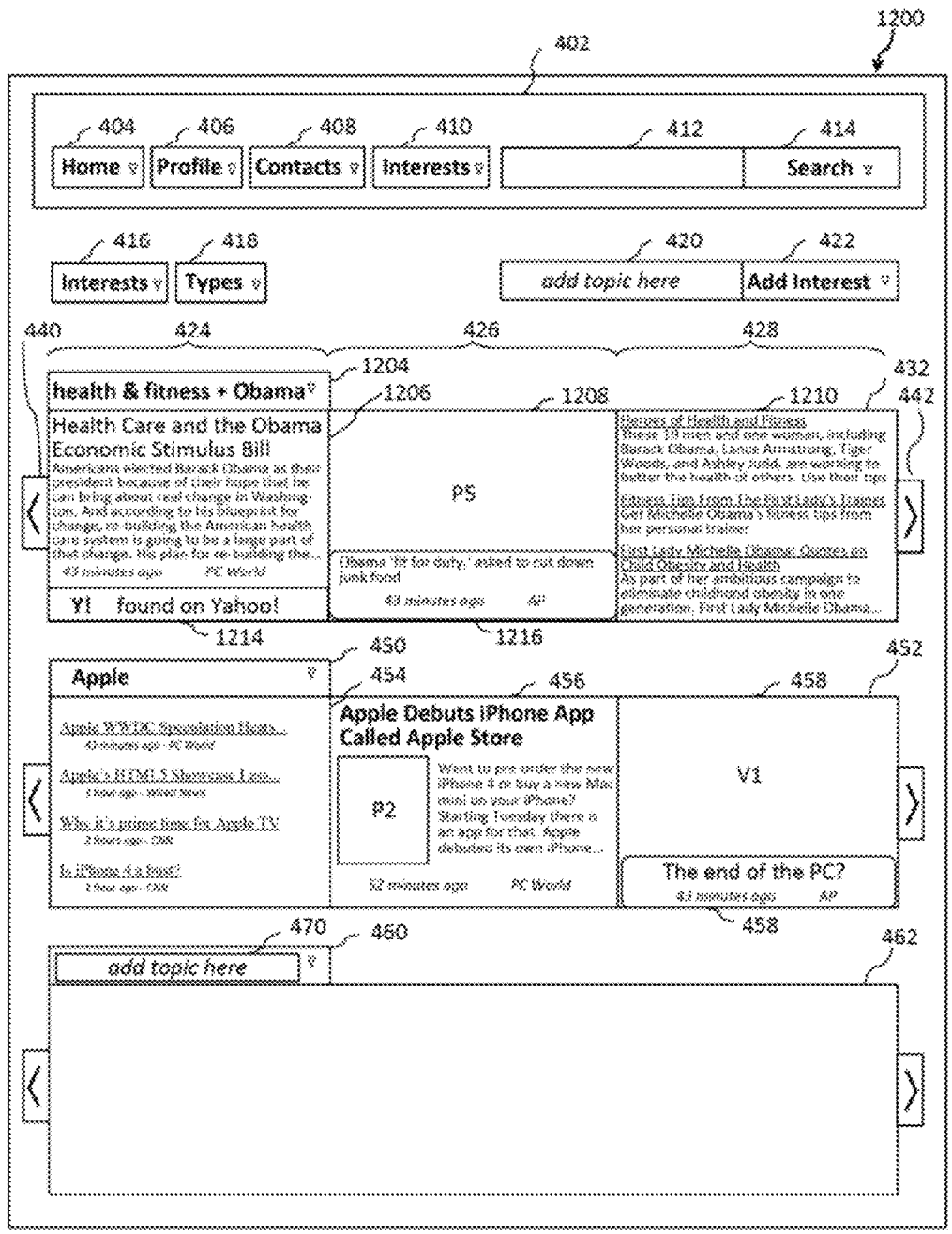

In contrast, as illustrated in the embodiment shown in FIGS. 10-12, a topic selected through manual entry in entry box 1004 may be treated as a refinement of or combination with another topic. As shown in FIGS. 10-12, a topic such as "Obama," selected by manual entry in topic entry box 1004 and selection of combine 1006, e.g., by positioning cursor 572 over combine 1006 and clicking the input device, is in effect a selection to treat the topic "Obama" as a refinement of or combination with the topic "health & fitness," thereby compounding an existing topic. The resulting compound topic "Health & Fitness+Obama" is shown in tab 1204 in FIG. 12. Such an event, i.e., a change in topic, may result in updated content for the changed topic as well as updated topic suggestions for the changed topic in accordance with steps 316 and 318. Various embodiments may employ a wide variety of user interfaces to effect topic selection and treatment. Each user interface may provide fixed treatment or variable treatment, e.g., multi-purpose interfaces providing selectable treatment options.

Figure 7:
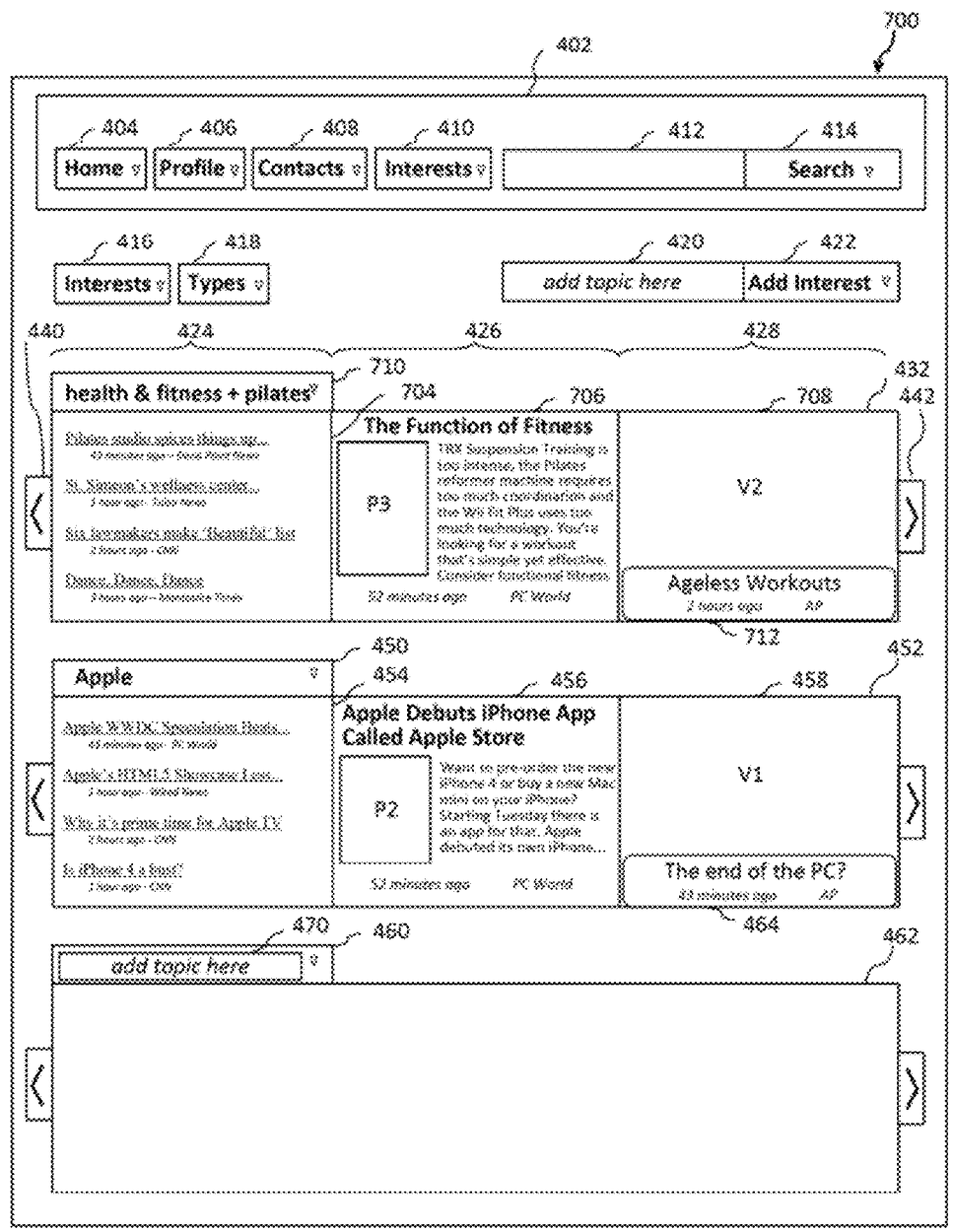

Regarding treatment of topics selected from suggested topics, menu 682 in FIG. 6 illustrates several treatment options. In menu 682, first option 684 comprises "combine [pilates with health & fitness] in this topic [interface]." The result of selecting the first option is shown in FIG. 7 by changes to topic interface 432 evident by comparing topic interface 432 in FIG. 4 to topic interface 432 in FIG. 7. As shown in tab 710, the selected topic "pilates" is treated as a refinement of or combination with existing topic "health & fitness" to create refined or compound topic "health & fitness+pilates." In menu 682, second option 685 comprises "combine [pilates with health & fitness] in new topic [interface]." The result of selecting the second option is shown in FIG. 8 by the addition of new topic interface 804. As shown in tab 814 for topic interface 804, the selected topic "pilates" is treated as a refinement of or combination with an existing topic "health & fitness" to create refined or compound topic "health & fitness+pilates." In menu 682, third option 686 comprises "[display pilates] alone in new topic [interface]." The result of selecting the third option is shown in FIG. 9 by the addition of new topic interface 904. As shown in tab 914 for topic interface 904, the selected topic "pilates" is treated as an individual or new topic. Although menu 682 provides three options, there may be any number of options. Another exemplary option is "alone—replace this topic," which would replace topic "health & fitness" with the topic "pilates" in topic interface 432.

In step 314, there is provided interface element(s) to select a topic interface to display the treated selected topic in an existing topic interface or an additional topic interface on the common page. Step 314 may be implemented, for example, by user interface module 202 and/or content provider module 206. In some embodiments, interface element(s) to treat a selected topic as in step 312 may overlap with or be the same as interface element(s) to select a topic interface as in step 314.

For example, as provided by user interface module 202, a topic manually entered in topic box 420, 470 and 1004 and submitted by selecting, respectively, add interest 422 or an option from its menu, an "enter" key on a keyboard or an option from a menu for tab 460 or combine 1006. Depending on the embodiment, e.g., whether user interface elements are multi-purpose interface elements offering numerous options, these interface elements may be used to select a new or existing interface to display the selected topic. As illustrated in the embodiment shown in FIGS. 4-12, a topic selected through manual entry in entry boxes 420 or 470 may be treated as an individual or new topic and may be selectively displayed in a new or existing topic interface. Selection of a topic interface encompasses choosing an option that indicates where the topic will be displayed. Selection encompasses choosing which topic box 420, 470 and 1004 to enter a topic into. In the embodiment shown in FIGS. 4-12, entering a topic into topic box would display the topic in a new topic interface. Entering a topic into topic box 470 would display the topic in existing topic interface 462. Entering a topic in entry box 1004 would display the topic in existing topic interface 432, as shown in FIGS. 11 and 12 by the selected and treated topic "Obama" being displayed in existing topic interface 432 as compound topic "Health & Fitness+Obama."

Regarding treatment of topics selected from suggested topics, menu 682 in FIG. 6 illustrates several topic interface selection options. In menu 682, first option 684 comprises "combine [pilates with health & fitness] in this topic [interface]." The result of selecting the first option is shown in FIG. 7 by changes to existing topic interface 432 evident by comparing topic interface 432 in FIG. 4 to topic interface 432 in FIG. 7. As shown in FIG. 7, the selected treated topic "pilates" is displayed in topic interface 432 as compound topic "health & fitness+pilates." In menu 682, second option 685 comprises "combine [pilates with health & fitness] in new topic [interface]." The result of selecting the second option is shown in FIG. 8 by the addition of new topic interface 804. As shown in FIG. 8, the selected treated topic "pilates" is displayed in new topic interface 804 as compound topic "health & fitness+pilates." In menu 682, third option 686 comprises "[display pilates] alone in new topic [interface]." The result of selecting the third option is shown in FIG. 9 by the addition of new topic interface 904. As shown in FIG. 9, the selected topic "pilates" is displayed in new topic interface 904 as new topic "pilates." Although menu 682 provides three options, there may be any number of options. Another exemplary option is "alone—replace this topic," which would display the selected topic "pilates" in an existing interface 432 by replacing topic "health & fitness" with the topic "pilates."

In step 316, topics suggested in each existing topic interface are updated based on content consumed by the user in the respective topic interface. Step 316 may be implemented, for example, by topic suggestion module 208. In some embodiments, step 316 may also be implemented by or in cooperation with an interest cloud module (not shown). For example, in some embodiments, one or more suggested topics may be generated from an interest cloud. In some embodiments, topics suggested in an existing topic interface, e.g., related or suggested topics 580, are updated based on or in response to one or more events. One such event may be a user's expression or indication of interest in content provided for a topic. A user may express interest in content, for example, by selecting, browsing, viewing, listening to or otherwise "consuming" the content (not shown). In determining topics to suggest in each topic interface for refinement of an existing topic, key term analysis of terms and/or phrases may be applied to content (e.g., text in a web page, metadata associated with content) selected and browsed or "consumed" by a user. For example, text may be analyzed using a keyword analysis technique to determine the key terms that are most commonly recited in the text. Such key term analysis may be applied for content consumed in each independent topic interface. Suggested topics may be revised immediately upon expression of interest in content or periodically, such as every minute or ten minutes. Where there are multiple events, e.g., when a user expresses interest in a plurality of content elements, suggested topics may be mixed, analyzed and/or weighted based on an algorithm to select a list of suggested topics to provide for updating step 316. In some embodiments, suggested topics may be updated based on content events in any topic interface, in select topic interfaces or only in the topic interface where the suggested topics are provided. In other embodiments, suggested topics may not be updated based on content events.

In step 318, content and suggested topics are updated in existing topic interfaces based on a change in topic, such as a replacement or refinement of an existing topic. Step 318 is similar to step 306, except that content and suggested topics are provided to an existing topic interface that has changed topic rather than to a new topic interface with a new topic. Like step 306, step 318 may be implemented, for example, by content retrieval module 204, content provider module 206 and topic suggestion module 208. In some embodiments, step 318 may also be implemented by or in cooperation with an interest cloud module (not shown). For example, in some embodiments, one or more suggested topics may be generated from an interest cloud. With regard to the provision of content, content retrieval module 204 may retrieve content from one or more sources based on the changed topic, which may be default or identified sources based on the changed topic. Upon retrieving the content, content provider module 206 may provide the retrieved content for display in the relevant topic interface. In some embodiments, content provider module 206 may edit and/or filter retrieved content to match specified parameters for content type and display format. For example, content may need to be trimmed or cropped to fit in the display format selected by the user. In other embodiments, there may be dedicated editing, formatting and/or filter modules (not shown) to serve these purposes.

Step 318 may be triggered or implemented for one or more topic modification events for existing topic interfaces. Events may include, for example, topic replacement and topic refinement or combination. One topic modification event may comprise selection of a suggested topic, selection to treat it as a combination and selection for display of the selected treated topic in the existing topic interface. Another topic modification event may comprise selection of a topic by manual entry, selection to treat it as a combination and selection for display of the selected treated topic in the existing topic interface. Other topic modification events may comprise, for example, selection of a topic by selection of a suggested topic or manual entry of a topic, selection to treat it as an individual or new topic and selection for display of the selected treated topic in an existing topic interface. In some embodiments, suggested topics may be updated based on topic modification events in any topic interface, in select topic interfaces or only in the topic interface where the suggested topics are provided. In other embodiments, suggested topics may not be updated based on topic modification events.

FIGS. 7 and 12 show exemplary implementations of step 318. As shown in FIG. 7, content 704, 706, 708 with caption 712 for video V2 based on the replaced or refined topic "health & fitness+pilates" is provided to topic interface 432 with tab 430 labeled for topic "health & fitness+pilates." Topic suggestions are also updated based on the changed topic "health & fitness+pilates," but the updated suggested topics are not shown because they are hidden until a user provides input such as moving cursor 572 over tab 710. Likewise, as shown in FIG. 12, content 1206, 1208, 1210 with source indicator 1214 and caption 1216 for picture P5 based on the replaced or refined topic "health & fitness+Obama" is provided to topic interface 432 with tab 1204 labeled for topic "health & fitness+Obama." Topic suggestions are also updated based on the changed topic "health & fitness+Obama," but the updated suggested topics are not shown because they are hidden until a user provides input such as moving cursor 572 over tab 1204.

In some embodiments, one or more steps 302-318 of method 300 may not be performed. Moreover, steps in addition to or in lieu of steps 302-318 may be performed in some example embodiments. Moreover, in some embodiments, some steps 302-318 may be merged. Similarly, in some embodiments one or more modules 202-210 may not be in user interface system 108. Moreover, modules in addition to modules 202-210 may be in embodiments of user interface system 108. Moreover, in some embodiments, modules 202-210 may be merged.

User interface system 108 and/or one or more modules therein in any embodiment may be implemented in hardware, software, firmware, or any combination thereof. For example, user interface system 108 and/or one or more modules therein in any embodiment may be implemented as computer program code configured to be executed in one or more processors. In another example, User interface system 108 and one or more modules therein in any embodiment may be implemented as hardware logic/electrical circuitry.

III. Example Computer Implementation

Figure 13:
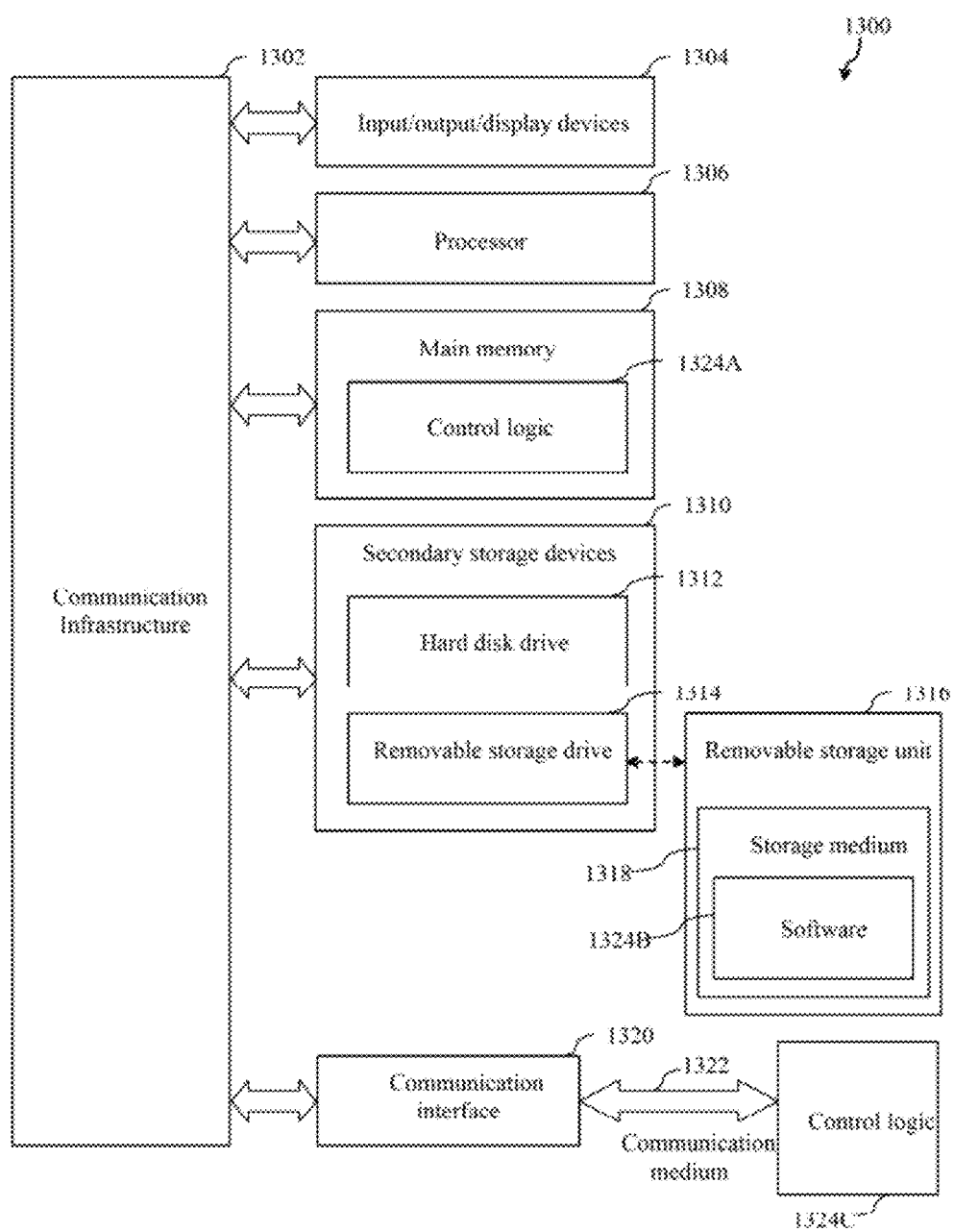
FIG. 13 is a block diagram of a computer in which embodiments may be implemented.

FIG. 13 is a block diagram of a computer in which embodiments may be implemented. The embodiments described herein, including systems, methods/processes, and/or apparatuses, may be implemented using well known computers, such as computer 1300 shown in FIG. 13. For example, elements of example computer system 100, including any of the user systems 102A-102M and any of the servers 106A-106N depicted in FIG. 1 and elements thereof, including user interface system 108 and all modules discussed herein and including each of the steps of each flowchart discussed herein can each be implemented using one or more computers 1300.

Computer 1300 can be any commercially available and well known computer capable of performing the functions described herein, such as computers available from International Business Machines, Apple, Sun, HP, Dell, Cray, etc. Computer 3200 may be any type of computer, including a desktop computer, a server, etc.

As shown in FIG. 13, computer 1300 includes one or more processors (e.g., central processing units (CPUs)), such as processor 1306. Processor 1306 may include each module discussed herein; or any portion or combination thereof, for example, though the scope of the embodiments is not limited in this respect. Processor 1306 is connected to a communication infrastructure 1302, such as a communication bus. In some embodiments, processor 1306 can simultaneously operate multiple computing threads.

Computer 1300 also includes a primary or main memory 1308, such as a random access memory (RAM). Main memory has stored therein control logic 1324A (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such as a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1324B (control logic) and/or data. Removable storage unit 1316 represents a floppy disk, magnetic tape, compact disc (CD), digital versatile disc (DVD), Blue-ray disc, optical storage disk, memory stick, memory card, or any other computer data storage device. Removable storage drive 1314 reads from and/or writes to removable storage unit 1316 in a well known manner.

Computer 1300 also includes input/output/display devices 1304, such as monitors, keyboards, pointing devices, etc.

Computer 1300 further includes a communication or network interface 1320. Communication interface 1320 enables computer 1300 to communicate with remote devices. For example, communication interface 1320 allows computer 1300 to communicate over communication networks or mediums 1322 (representing a form of a computer useable or readable medium), such as local area networks (LANs), wide area networks (WANs), the Internet, etc. Network interface 1320 may interface with remote sites or networks via wired or wireless connections. Examples of communication interface 1322 include but are not limited to a modem, a network interface card (e.g., an Ethernet card), a communication port, a Personal Computer Memory Card International Association (PCMCIA) card, etc.

Control logic 1324C may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments of the invention.

For example, each of the elements of example servers 106A-106N, including user interface system 108 of FIG. 1; all modules discussed herein; and each of the steps of each flowchart discussed herein can be implemented as control logic that may be stored on a computer useable medium or computer readable medium, which can be executed by one or more processors to operate as described herein.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The proper interpretation of subject matter described and claimed herein is limited to patentable subject matter under 35 U.S.C. § 101. As described and claimed herein, a method is a process defined by 35 U.S.C. § 101. As described and claimed herein, each of a device, apparatus, machine, system, computer, module, computer readable media, media, is a machine or manufacture defined by 35 U.S.C. § 101.

What is claimed is:

1. A method comprising:
    initiating displaying, via control logic, on one common page, an interface comprising a search element and at least two independent topic interfaces comprising a first independent topic interface for a first topic of a plurality of topics and at least a second independent topic interface for at least a second topic of the plurality of topics, wherein of the at least two independent topic interfaces:
        a first topic interface displaying at least one first topic and at least two different first types of content relating to the at least one first topic, the at least two different first types of content being selectable by a user via a user input, and
        a second topic interface displaying at least one second topic and at least two different second types of content relating to the at least one second topic, the at least two different second types of content being selectable by a user via a user input, the at least two different first types of content being different from the at least two different second types of content;
    wherein at least one of the first or second topic interfaces is to: display one or more suggested topics at least partially responsive to a first user interaction with a first position on a display device, and hide the one or more suggested topics from display at least partially in response to a second user interaction with a second position on the display device; and
    wherein in response to receiving an input, via a network, to combine or modify the at least one first topic with one or more suggested topics, displaying a selection of the one or more portions via the first topic interface, by the control logic, to display two or more items of different types of content and respective links to portions of the two or more items of different types of content relating to the first topic after being modified or combined.

2. The method of claim 1, further comprising:
    displaying content, for a third topic interface, based, at least in part, on a user selection of a third topic.

3. The method of claim 2, further comprising:
    displaying a plurality of suggested topics for modification or combination of the third topic interface in response to the selection of the third topic.

4. The method of claim 3, wherein a plurality of suggested topics for the first topic interface are suggested independent of the plurality of suggested topics for the third topic interface.

5. The method of claim 2, wherein displaying content comprises refining or replacing existing content in the third topic interface in response to the selecting of the third topic interface for modification or combination.

6. The method of claim 2, wherein the content comprises search results from a search engine query based, at least in part, on the third topic.

7. The method of claim 1, further comprising: updating suggested topics, for the first or second topic interfaces, based, at least in part, on selection(s) of content displayed in the first or second topic interfaces, respectively.

8. The method of claim 7, wherein a suggested topic comprises a selected term or phrase.

9. The method of claim 7, wherein one or more suggested topics are generated from an interest cloud.

10. The method of claim 1 and further comprising selecting one or more types of the content via the interface.

11. The method of claim 1 and further comprising selecting one or more sources of the content via the interface.

12. The method of claim 1 and further comprising selecting a format of the content via the interface, wherein display formats are capable of varying between topic interfaces.

13. The method of claim 1 and further comprising controlling whether to save a selected topic in saved topics or discard the selected topic via the interface.

14. The method of claim 13 and further comprising selecting a third topic from the saved topics via the interface.

15. The method of claim 14, wherein selecting the third topic from the saved topics is performed manually or automatically.

16. The method of claim 15, wherein the third topic is automatically selected from the saved topics based, at least in part, on a priority level or ranking of the third topic.

17. The method of claim 1 and further comprising managing individual topic interfaces by repositioning or deleting the topic interfaces via the interface.

18. A method comprising:
generating an interface on one common page, the user interface comprising a search element and at least two independent topic interfaces comprising a first independent topic interface for a first topic of a plurality of topics and at least a second independent topic interface for at least a second topic of the plurality of topics;
generating content for a first topic interface in response to receiving a first topic via an input;
generating suggested topics in response to receiving the first topic for the first topic interface wherein at least one of the first or second independent topic interfaces is to display one or more of the suggested topics at least partially responsive to a first user interaction with a first position on a display device, and hide the one or more suggested topics from display at least partially in response to a second user interaction with a second position on the display device; and
displaying at least two different types of first content within the first topic interface or at least two different types of second content within a second topic interface based, at least in part, on a selection of a treatment of a second topic from the suggested topics, wherein the at least two different first types of content are selectable by user via a user input, the at least two different second types of content are selectable by the user via the user input, and the at least two different first types of content are different from the at least two different second types of content; and
wherein in response to receiving an input to combine or modify the first topic with at least one of the suggested topics displayed, generating a combined or modified first topic, modifying a selection of portions displayed via the first topic interface, and displaying two or more items of different types of content relating to the first topic after being modified or combined.

19. A system comprising:
a computing device to: initiate display of an interface on one common page, the interface to comprise at least two independent topic interfaces to comprise a search element and at least a first independent topic interface for at least a first topic of a plurality of topics and at least a second independent topic interface for at least a second topic of the plurality of topics,
a first topic interface to display at least one first topic and at least two different first types of content to relate to the at least one first topic, the at least two different first types of content being selectable by a user via a user input, and
a second topic interface to display at least one second topic and at least two different second types of content to relate to the at least one second topic, the at least two different second types of content being selectable by a user via a user input, the at least two different first types of content being different from the at least two different second types of content;
wherein at least one of the first or second topic interfaces is to: display one or more suggested topics at least partially responsive to a first user interaction with a first position on a display device, and hide the one or more suggested topics from display at least partially in response to a second user interaction with a second position on the display device; and
wherein in response to receipt of an input to combine or modify the at least one first topic with one or more topics to be suggested to generate for the first topic to be combined or modified, a selection of portions to be displayed via the first topic interface to comprise two or more items of different types of content to relate to the first topic to be combined or modified.

* * * * *